US012794764B2

(12) United States Patent
Venugopal et al.

(10) Patent No.: US 12,794,764 B2
(45) Date of Patent: Nov. 10, 2026

(54) BEAM RECOVERY WITHOUT BEAM CORRESPONDENCE

(71) Applicant: QUALCOMM Incorporated, San Diego, CA (US)

(72) Inventors: Kiran Venugopal, Raritan, NJ (US); Makesh Pravin John Wilson, San Diego, CA (US); Tianyang Bai, Bridgewater, NJ (US); Jung Ho Ryu, Fort Lee, NJ (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 16/598,946

(22) Filed: Oct. 10, 2019

(65) Prior Publication Data

US 2020/0136895 A1 Apr. 30, 2020

Related U.S. Application Data

(60) Provisional application No. 62/750,225, filed on Oct. 24, 2018.

(51) Int. Cl.
*H04L 12/24* (2006.01)
*H04B 7/06* (2006.01)
(Continued)

(52) U.S. Cl.
CPC ....... *H04L 41/0668* (2013.01); *H04B 7/0617* (2013.01); *H04B 7/06964* (2023.05); (Continued)

(58) Field of Classification Search
None
See application file for complete search history.

(56) References Cited

U.S. PATENT DOCUMENTS

2019/0053314 A1* 2/2019 Zhou .................... H04B 7/0695
2019/0215820 A1* 7/2019 Cirik .................. H04W 72/046
(Continued)

OTHER PUBLICATIONS

Asustek: "Remaining Issues on Beam Management", 3GPP Draft, 3GPP TSG RAN WG1 Meeting #94, R1-1809225 Remaining Issues on Beam Management, 3rd Generation Partnership Project (3GPP), Mobile Competence Centre, 650, Route Des Lucioles, F-06921 Sophia-Antipolis Cedex, France, vol. RAN WG1, No. Gothenburg. Sweden, Aug. 20, 2018-Aug. 24, 2018, Aug. 10, 2018 (Aug. 10, 2018), XP051516593, 7 Pages, Retrieved from the Internet: URL: http://www.3gpp.org/ftp/tsg%5Fran/WG1%5FRL1/TSGR1%5F94/Docs/R1%2D1809225%2Ezip. [Retrieved on Aug. 10, 2018] BRF procedure considering TA related issues; p. 4, paragraph 3.1-p. 5.
(Continued)

*Primary Examiner* — Suk Jin Kang
(74) *Attorney, Agent, or Firm* — Muncy, Geissler, Olds & Lowe, P.C./Qualcomm

(57) ABSTRACT

Disclosed are techniques for beam failure recovery in a wireless communications system. In an aspect, a user equipment (UE) detects a beam failure of a first downlink beam received at the UE from a base station, sends, to the base station, a random access channel (RACH) request identifying one or more candidate downlink beams received at the UE from the base station, and, in response to sending the RACH request, receives, from the base station, a response to the RACH request, the response identifying a second downlink beam from the one or more candidate downlink beams to replace the first downlink beam and indicating a type of beam recovery associated with the second downlink beam for which downlink beam resources have been reserved.

23 Claims, 16 Drawing Sheets

(51) Int. Cl.

| | |
|---|---|
| ***H04L 5/00*** | (2006.01) |
| ***H04L 41/0668*** | (2022.01) |
| ***H04W 72/04*** | (2023.01) |
| ***H04W 72/23*** | (2023.01) |
| ***H04W 74/08*** | (2024.01) |
| ***H04W 74/0833*** | (2024.01) |
| *H04W 72/044* | (2023.01) |
| *H04W 74/0838* | (2024.01) |

(52) U.S. Cl.

CPC ........... *H04L 5/0048* (2013.01); *H04W 72/23* (2023.01); *H04W 74/0833* (2013.01); *H04W 72/046* (2013.01); *H04W 74/0838* (2024.01)

(56) References Cited

U.S. PATENT DOCUMENTS

| | | | | |
|---|---|---|---|---|
| 2019/0215888 | A1* | 7/2019 | Cirik | H04B 17/17 |
| 2019/0253127 | A1* | 8/2019 | Kang | H04B 7/088 |
| 2019/0253941 | A1* | 8/2019 | Cirik | H04W 36/0077 |
| 2019/0305840 | A1* | 10/2019 | Cirik | H04W 76/38 |
| 2019/0306765 | A1* | 10/2019 | Cirik | H04W 36/0058 |
| 2019/0306875 | A1* | 10/2019 | Zhou | H04W 72/1284 |
| 2019/0306909 | A1* | 10/2019 | Zhou | H04W 72/04 |
| 2019/0313264 | A1* | 10/2019 | Lin | H04W 76/11 |
| 2020/0036430 | A1* | 1/2020 | Kim | H04W 24/10 |
| 2020/0045569 | A1* | 2/2020 | Seo | H04B 7/0695 |
| 2020/0052769 | A1* | 2/2020 | Cirik | H04L 1/0026 |
| 2020/0059398 | A1* | 2/2020 | Pan | H04W 72/0413 |
| 2020/0100311 | A1* | 3/2020 | Cirik | H04L 5/0023 |
| 2020/0221428 | A1* | 7/2020 | Moon | H04L 5/00 |
| 2020/0228185 | A1* | 7/2020 | Tao | H04B 7/0617 |
| 2020/0260300 | A1* | 8/2020 | Cirik | H04L 5/0048 |
| 2020/0351860 | A1* | 11/2020 | Chen | H04W 74/0833 |
| 2020/0374960 | A1* | 11/2020 | Deenoo | H04W 72/1284 |
| 2020/0382197 | A1* | 12/2020 | Kang | H04W 72/085 |
| 2020/0389223 | A1* | 12/2020 | Guan | H04B 7/088 |
| 2020/0389884 | A1* | 12/2020 | Hakola | H04B 7/0695 |
| 2020/0413395 | A1* | 12/2020 | Chen | H04W 74/008 |
| 2021/0006456 | A1* | 1/2021 | Kim | H04L 43/16 |
| 2021/0013950 | A1* | 1/2021 | Yang | H04L 5/0094 |
| 2021/0014884 | A1* | 1/2021 | Yang | H04W 72/04 |
| 2021/0021321 | A1* | 1/2021 | Liu | H04W 72/0413 |
| 2021/0028978 | A1* | 1/2021 | Zhou | H04W 76/27 |
| 2021/0058129 | A1* | 2/2021 | Takeda | H04W 24/04 |
| 2021/0058130 | A1* | 2/2021 | Zhu | H04B 7/06964 |
| 2021/0058998 | A1* | 2/2021 | Yuan | H04W 72/0413 |
| 2021/0144794 | A1* | 5/2021 | Zhou | H04W 72/042 |
| 2021/0153074 | A1* | 5/2021 | Yang | H04W 36/0055 |
| 2021/0185756 | A1* | 6/2021 | Cirik | H04W 72/0446 |
| 2021/0297138 | A1* | 9/2021 | Matsumura | H04W 76/19 |
| 2021/0298029 | A1* | 9/2021 | Liu | H04W 72/0453 |
| 2021/0336685 | A1* | 10/2021 | Cirik | H04W 72/046 |
| 2021/0376901 | A1* | 12/2021 | Cirik | H04L 5/0094 |
| 2021/0377826 | A1* | 12/2021 | Cirik | H04W 36/0069 |
| 2022/0060914 | A1* | 2/2022 | Zhou | H04W 24/04 |
| 2022/0158713 | A1* | 5/2022 | Cirik | H04W 72/0453 |
| 2022/0158891 | A1* | 5/2022 | Zhou | H04W 76/27 |
| 2022/0201792 | A1* | 6/2022 | Zhou | H04W 72/21 |
| 2022/0217592 | A1* | 7/2022 | Cirik | H04W 36/0079 |
| 2022/0240144 | A1* | 7/2022 | Cirik | H04B 7/0695 |
| 2022/0322480 | A1* | 10/2022 | Deenoo | H04W 72/23 |
| 2023/0113640 | A1* | 4/2023 | Zhou | H04W 76/27<br>370/225 |
| 2023/0199889 | A1* | 6/2023 | Yuan | H04W 72/21<br>370/216 |
| 2023/0199890 | A1* | 6/2023 | Cirik | H04L 5/0023<br>370/228 |

OTHER PUBLICATIONS

Ericsson: “Maintenance for Beam Management”, 3GPP Draft, 3GPP TSG-RAN WG1 Meeting #94bis, R1-1811187 Maintenance for Beam Management, 3rd Generation Partnership Project (3GPP), Mobile Competence Centre, 650, Route Des Lucioles, F-06921 Sophia-Antipolis Cedex, France, vol. RAN WG1, Chengdu, China, Oct. 8, 2018-Oct. 12, 2018, Sep. 29, 2018 (Sep. 29, 2018), XP051518588, 10 Pages, Retrieved from the Internet: URL: http://www.3gpp.org/ftp/tsg%5Fran/WG1%5FRL1/TSGR1%5F94b/Docs/R1%2D1811187%2Ezip [retrieved on Sep. 29, 2018] Default UL beam for PUCCH; p. 4, paragraph 2.2.1-p. 5.

Huawei, et al., “Beam Failure Recovery for SCell”, 3GPP Draft, 3GPP TSG RAN WG1 Meeting #94bis, R1-1810106, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12,2018, Sep. 29, 2018 (Sep. 29, 2018), XP051517521, 6 Pages, Retrieved from the Internet: URL: http://www.3gpp.org/ftp/tsg%5Fran/WG1%6FRL1/TSGR1%5F94b/Docs/R1%2D1810106%2Ezip. [retrieved on Sep. 29, 2018], Scenario for Beam Failure Recovery for SCell; p. 1, paragraph 2.1-p. 3; Enhancements for beam failure recovery for SCell; p. 3, paragraph 2.2-p. 6.

Huawei, et al., “Discussion on Beam Failure Recovery for SCell”,3GPP Draft, 3GPP TSG-RAN WG2 Meeting 102, R2-1807975 Discussion on Beam Failure Recovery for Scell, 3rd Generation Partnership Project (3GPP), Mobile Competence Centre, 650, Route Des Lucioles, F-06921 Sophia-Antipolis Cedex, F, vol. RAN WG2, No. Busan, Korea, May 21, 2018-May 25, 2018, May 20, 2018 (May 20, 2018), XP051444300, 9 Pages, Retrieved from the Internet: URL: http://www.3gpp.org/ftp/Meetings%5F3GPP%5FSYNC/RAN2/Docs/ [Retrieved on May 20,2018], Beam Failure Recovery for SCell; p. 1, paragraph 2-p. 4.

Interdigital Inc: “BFR on SCell”, 3GPP Draft, 3GPP TSG-RAN WG2, RAN2#102, R2-1806821 (R15 NR WI AI103142 BFR on SCELL), 3rd Generation Partnership Project (3GPP), Mobile Competence Centre; 650, Route Des Lucioles, F-06921 Sophia-Antipolis Cedex, France, vol. RAN WG2. No. Busan, Republic of Korea, May 21, 2018-May 25, 2018, May 20, 2018 (May 20, 2018), XP051443272, 2 Pages, Retrieved from the Internet: URL:http://www.3gpp.org/tp/Meetings%5F3GPP%5FSYNC/RAN2/Docs/ [retrieved on May 20, 2018] Discussion, p. 1, paragraph 2-p. 2.

International Search Report and Written Opinion—PCT/US2019/055943—ISA/EPO—Jan. 21, 2020.

OPPO: “Discussion on Multi-beam Operation Enhancements”, 3GPP Draft, 3GPP TSG RAN WG1 Meeting #94bis, R1-1811635, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Oct. 1, 2018 (Oct. 1, 2018), XP051519029, 5 Pages, Retrieved from the Internet: URL:http://www.3gpp.org/ftp/tsg%5Fran/WG1%5FRL1/TSGR1%5F94b/Docs/R1%2D1811635%2Ezip. [Retrieved on Oct. 1, 2018], Support of Multiple Tx panels at UE side; p. 2, paragraph 2.2-p. 3 Enhancement of BFR; p. 3, paragraph 2.3-p. 4.

* cited by examiner

BEAM RECOVERY WITHOUT BEAM CORRESPONDENCE

CROSS-REFERENCE TO RELATED APPLICATIONS

The present Application for Patent claims the benefit of U.S. Provisional Application No. 62/750,225, entitled "BEAM RECOVERY WITHOUT BEAM CORRESPONDENCE," filed Oct. 24, 2018, assigned to the assignee hereof, and expressly incorporated herein by reference in its entirety.

BACKGROUND

Technical Field

The present disclosure relates generally to wireless communications systems, and more particularly to beam recovery without beam correspondence in a wireless communications system that supports primary cell (PCell) and secondary cell (SCell) carrier aggregation operations.

Background

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is a fifth generation (5G) telecommunications standard referred to as "New Radio" (NR). NR is part of a continuous mobile broadband evolution promulgated by the Third Generation Partnership Project (3GPP) to meet new requirements associated with latency, reliability, security, scalability (e.g., with the Internet of Things (IoT)), and other requirements. Some aspects of 5G NR may be based on the fourth generation (4G) telecommunications standard referred to as the Long Term Evolution (LTE) standard. There exists a need for further improvements in NR technology. These improvements may also be applicable to other multi-access technologies and the telecommunication standards that employ these technologies.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of beam failure recovery in a wireless communications system includes detecting, by a user equipment (UE), a beam failure of a first downlink beam received at the UE from a base station, sending, by the UE to the base station, a random access channel (RACH) request identifying one or more candidate downlink beams received at the UE from the base station, and, in response to sending the RACH request, receiving, at the UE from the base station, a response to the RACH request, the response identifying a second downlink beam from the one or more candidate downlink beams to replace the first downlink beam and indicating a type of beam recovery associated with the second downlink beam for which downlink beam resources have been reserved.

In an aspect, a method of beam failure recovery in a wireless communications system includes receiving, at a base station from a UE, a RACH request identifying one or more candidate downlink beams received at the UE from the base station, and, in response to receiving the RACH request, sending, from the base station to the UE, a response to the RACH request, the response identifying a second downlink beam from the one or more candidate downlink beams to replace the first downlink beam and indicating a type of beam recovery associated with the second downlink beam for which downlink beam resources have been reserved.

In an aspect, an apparatus for beam failure recovery in a wireless communications system includes at least one processor of a UE configured to: detect a beam failure of a first downlink beam received at the UE from a base station, send, to the base station, a RACH request identifying one or more candidate downlink beams received at the UE from the base station, and receive, from the base station, in response to the RACH request being sent, a response to the RACH request, the response identifying a second downlink beam from the one or more candidate downlink beams to replace the first downlink beam and indicating a type of beam recovery associated with the second downlink beam for which downlink beam resources have been reserved.

In an aspect, an apparatus for beam failure recovery in a wireless communications system includes at least one processor of a base station serving a UE configured to: receive, from the UE, a RACH request identifying one or more candidate downlink beams received at the UE from the base station, and send, to the UE, in response to reception of the RACH request, a response to the RACH request, the response identifying a second downlink beam from the one or more candidate downlink beams to replace the first downlink beam and indicating a type of beam recovery associated with the second downlink beam for which downlink beam resources have been reserved.

In an aspect, an apparatus for beam failure recovery in a wireless communications system includes means for detecting, by a UE, a beam failure of a first downlink beam received at the UE from a base station, means for sending, by the UE to the base station, a RACH request identifying one or more candidate downlink beams received at the UE from the base station, and means for receiving, at the UE from the base station, in response to sending the RACH request, a response to the RACH request, the response identifying a second downlink beam from the one or more candidate downlink beams to replace the first downlink beam and indicating a type of beam recovery associated with the second downlink beam for which downlink beam resources have been reserved.

In an aspect, an apparatus for beam failure recovery in a wireless communications system includes means for receiving, at a base station from a UE, a RACH request identifying one or more candidate downlink beams received at the UE from the base station, and means for sending, from the base station to the UE, in response to receiving the RACH request, a response to the RACH request, the response identifying a second downlink beam from the one or more candidate downlink beams to replace the first downlink beam and indicating a type of beam recovery associated with the second downlink beam for which downlink beam resources have been reserved.

In an aspect, a non-transitory computer-readable medium storing computer-executable instructions includes computer-executable instructions comprising at least one instruction instructing a UE to detect a beam failure of a first downlink beam received at the UE from a base station, at least one instruction instructing the UE to send, to the base station, a RACH request identifying one or more candidate downlink beams received at the UE from the base station, and at least one instruction instructing the UE to receive, from the base station in response to sending the RACH request, a response to the RACH request, the response identifying a second downlink beam from the one or more candidate downlink beams to replace the first downlink beam and indicating a type of beam recovery associated with the second downlink beam for which downlink beam resources have been reserved.

In an aspect, a non-transitory computer-readable medium storing computer-executable instructions includes computer-executable instructions comprising at least one instruction instructing a base station to receive, from a UE, a RACH request identifying one or more candidate downlink beams received at the UE from the base station, and at least one instruction instructing the base station to send, to the UE in response to receiving the RACH request, a response to the RACH request, the response identifying a second downlink beam from the one or more candidate downlink beams to replace the first downlink beam and indicating a type of beam recovery associated with the second downlink beam for which downlink beam resources have been reserved.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
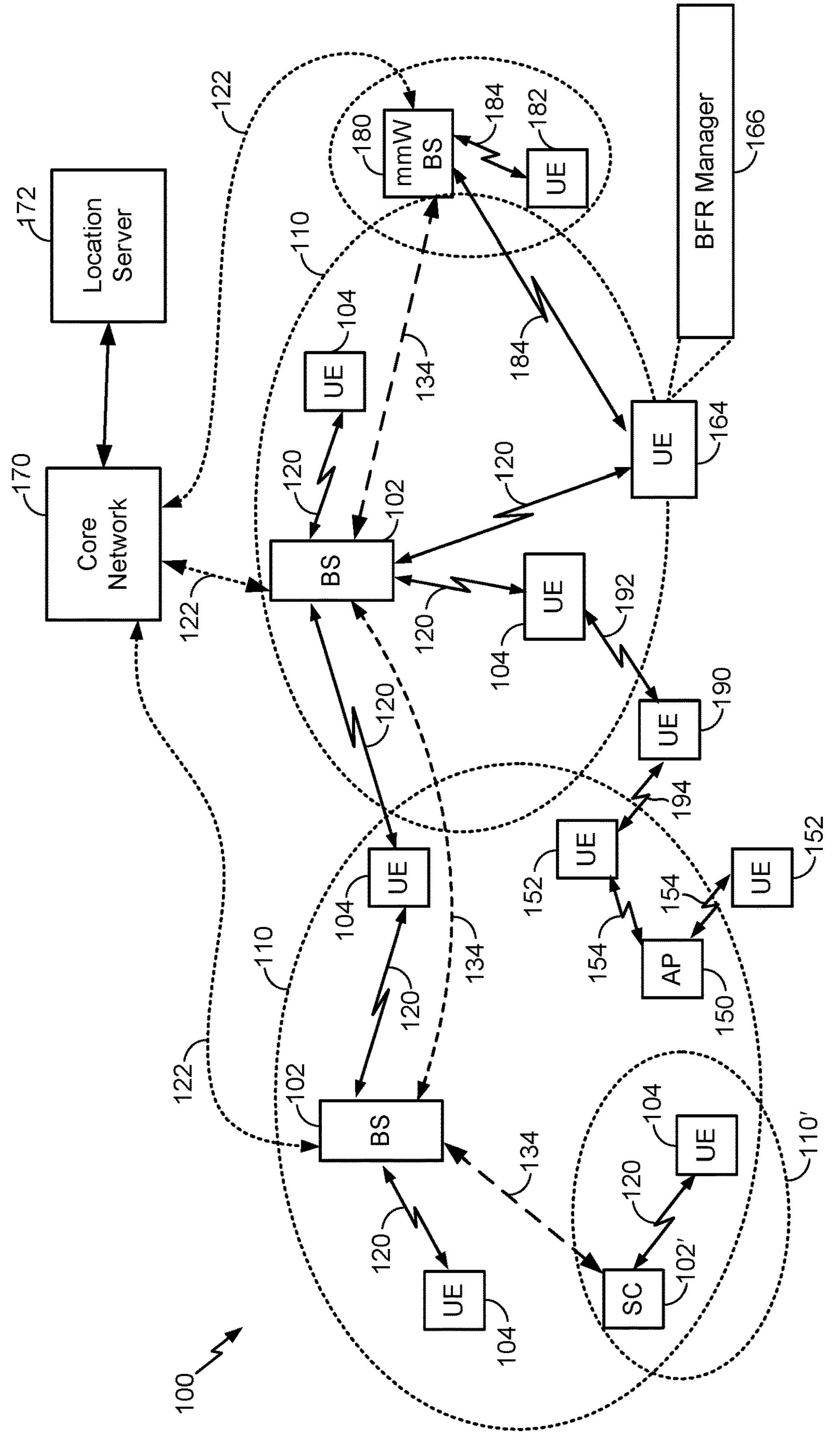
FIG. 1 is a diagram illustrating an example of a wireless communications system and an access network, according to aspects of the disclosure.

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

The disclosure set forth below in connection with the appended drawings is intended as a description of various configurations and is not intended to represent the only configurations in which the concepts described herein may be practiced. The disclosure includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference radio frequency (RF) signals the UE is measuring.

According to various aspects, FIG. 1 illustrates an exemplary wireless communications system 100. The wireless communications system 100 (which may also be referred to as a wireless wide area network (WWAN)) may include various base stations 102 and various UEs 104. In an aspect, the base stations 102 may include eNBs where the wireless communications system 100 corresponds to an LTE network, or gNBs where the wireless communications system 100 corresponds to a 5G network, or a combination of both.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 122, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

In cellular networks, "macro cell" base stations provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Thus, to improve indoor or other specific geographic coverage, such as for residential homes and office buildings, additional "small cell" base stations have begun to be deployed to supplement the coverage of conventional macro networks. Small cell base stations may also provide incremental capacity growth, richer user experience, and so on. Small cell base stations are generally low-powered base stations that may include or be otherwise referred to as femto cells, pico cells, micro cells, etc.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or DL (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit beams may be quasi-collocated, meaning that they appear to the receiver as having the same parameters, regardless of whether or not the transmitting antennas themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameters of a second reference RF signal transmitted on the same channel.

In NR, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells."

For example, the base stations 102/UEs 104 may use spectrum up to Y MHz (e.g., 5, 10, 15, 20, 100 MHz) bandwidth per component carrier allocated in a carrier aggregation of up to a total of Yx MHz (x component carriers) used for transmission in each direction. The component carriers may or may not be adjacent to each other on the frequency spectrum. Allocation of carriers may be asymmetric with respect to the DL and UL (e.g., more or less carriers may be allocated for DL than for UL).

In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, the base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The component carriers may or may not be adjacent to each other on the frequency spectrum. Allocation of carriers may be asymmetric with respect to the DL and UL (e.g., more or less carriers may be allocated for DL than for UL). One of the component carriers utilized by a macro cell base station 102 may be an anchor carrier (or "PCell") and other component carriers utilized by the macro cell base stations 102 and/or the mmW base station 180, for example, may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102/UE 104 is equipped with multiple receivers and/or transmitters. For example, a UE 104 may have two receivers, Receiver 1 and Receiver 2, where Receiver 1 is a multi-band receiver that can be tuned to band (i.e., carrier frequency) X or band Y, and Receiver 2 is a one-band receiver tuneable to band Z only. In this example, if the UE 104 is being served in band X, band X would be referred to as the PCell or the active carrier frequency, and Receiver 1 would need to tune from band X to band Y (an SCell) in order to measure band Y (and vice versa). In contrast, whether the UE 104 is being served in band X or band Y, because of the separate Receiver 2, the UE 104 can measure band Z without interrupting the service on band X or band Y.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an aspect, the D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, LTE Direct (LTE-D), WiFi Direct (WiFi-D), Bluetooth, ZigBee, Z-Wave, Wi-Fi based on the IEEE 802.11 standard, LTE, or NR.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include a beam failure recovery (BFR) manager 166 that may enable the UE 164 to perform the UE operations described herein, such as, for example, the operations described with reference to FIGS. 6, 7, 8A, 8B, 9A, 9B, 10A, 10B, 11, and 12. Note that although only one UE in FIG. 1 is illustrated as having a BFR manager 166, any of the UEs in FIG. 1 may be configured to perform the UE operations described herein.

Figure 2A:
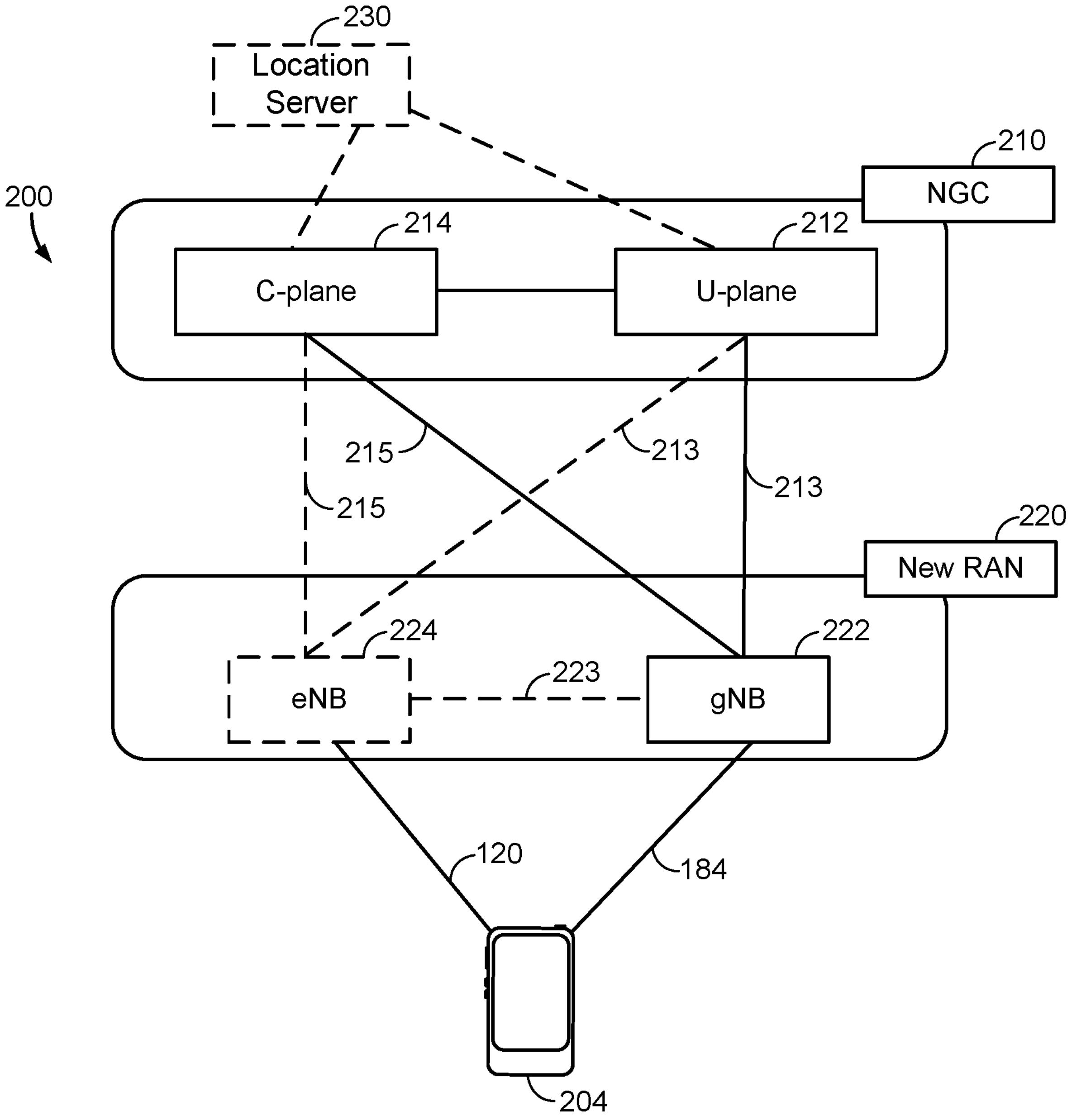
FIGS. 2A and 2B illustrate example wireless network structures, according to various aspects of the disclosure.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230 (which may correspond to location server 172), which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
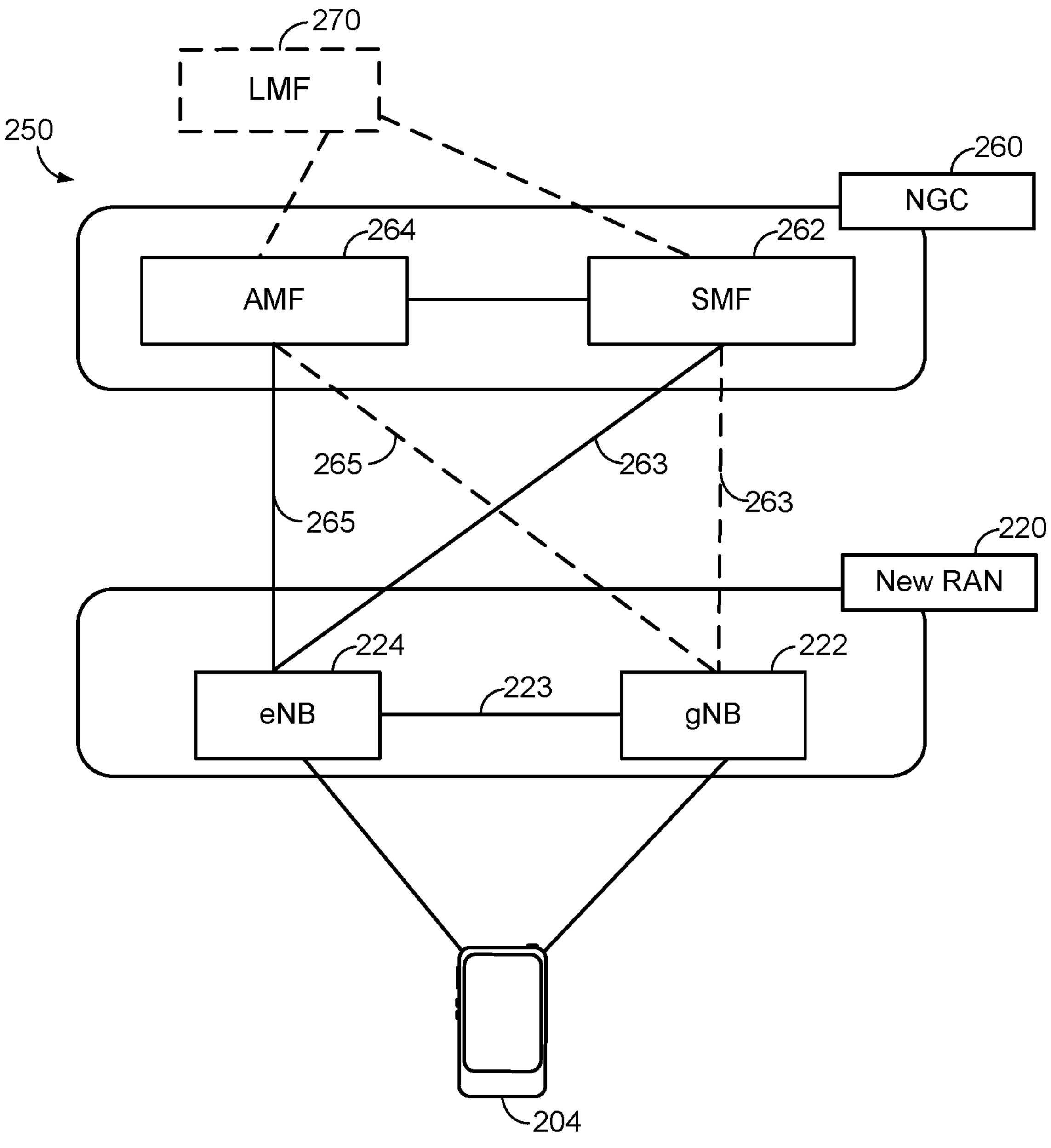

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

In an aspect, the UE 204 illustrated in FIGS. 2A and 2B may be configured to perform the UE operations described herein. For example, the UE 204 may be configured to detect a beam failure of a first downlink beam received at the UE 204 from a base station (e.g., gNB 222), send, to the base station, a RACH request identifying one or more candidate downlink beams received at the UE 204 from the base station, and receive, from the base station, a response to the RACH request. The response may identify a second downlink beam from the one or more candidate downlink beams to replace the first downlink beam, and may also indicate a type of beam recovery associated with the second downlink beam for which the base station has reserved downlink beam resources.

In an aspect, the gNB 222 illustrated in FIGS. 2A and 2B may be configured to perform the base station operations described herein. For example, the gNB 222 may be configured to receive, from a UE (e.g., UE 204), a RACH request identifying one or more candidate downlink beams received at the UE from the gNB 222, and send, to the UE, a response to the RACH request. The response may identify a second downlink beam from the one or more candidate downlink beams to replace a first downlink beam, and may also indicate a type of beam recovery associated with the second downlink beam for which downlink beam resources have been reserved.

Figure 3:
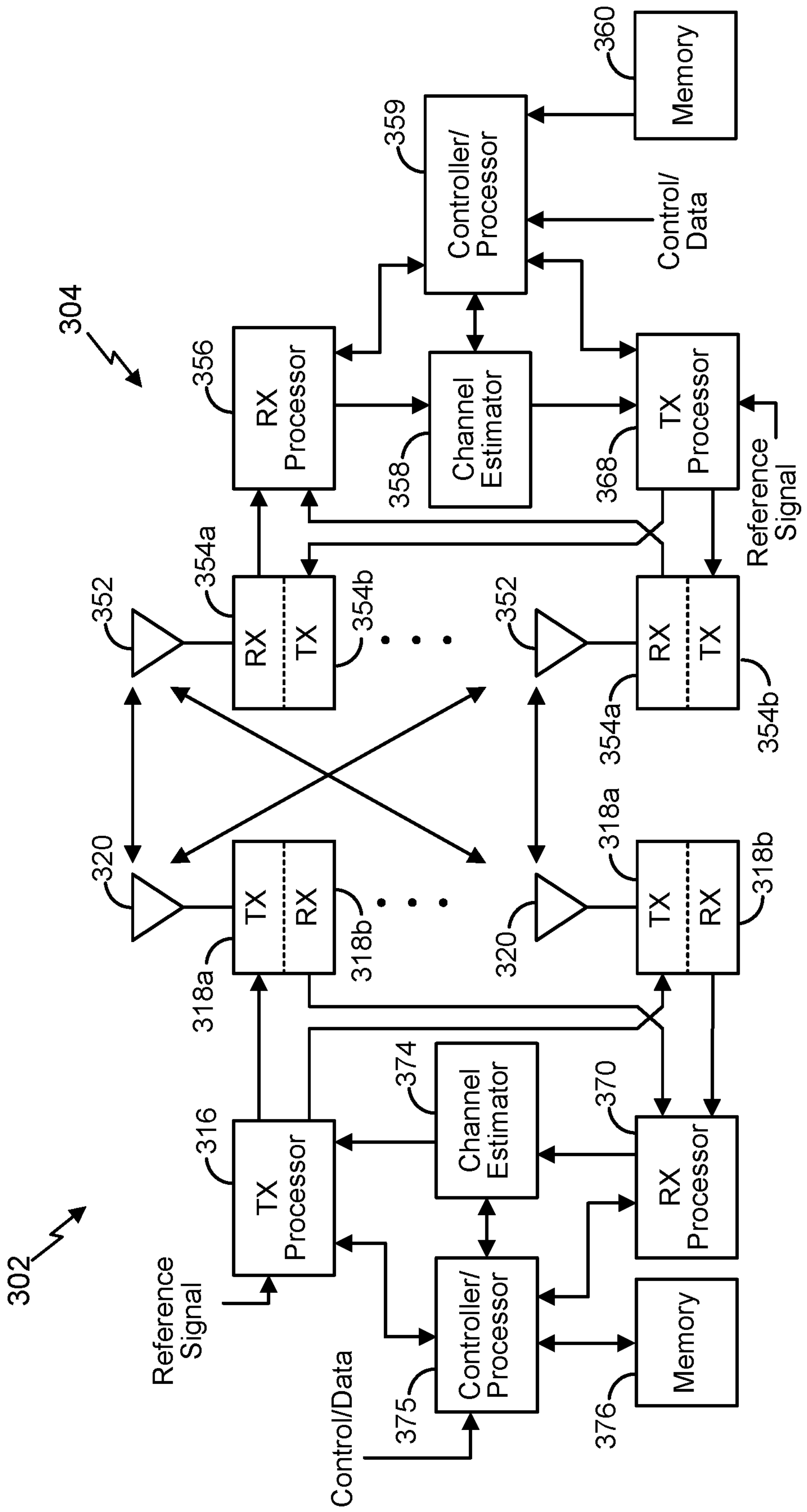
FIG. 3 is a diagram illustrating an example of a base station and a UE in an access network, according to aspects of the disclosure.

According to various aspects, FIG. 3 illustrates an exemplary base station 302 (e.g., an eNB, a gNB, a small cell AP, a WLAN AP, etc.) in communication with an exemplary UE 304 in a wireless network, according to aspects of the disclosure. The base station 302 may correspond to any of the base stations described herein, such as base stations 102, 150, and 180 in FIG. 1 or gNB 222 or eNB 224 in FIGS. 2A and 2B. The UE 304 may correspond to any of of the UEs described herein, such as UEs 104, 152, 182, 190 in FIG. 1 or UE 204 in FIGS. 2A and 2B. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 304. Each spatial stream may then be provided to one or more different antennas 320 via a separate transmitter 318*a*. Each transmitter 318*a* may modulate an RF carrier with a respective spatial stream for transmission.

At the UE 304, each receiver 354*a* receives a signal through its respective antenna 352. Each receiver 354*a* recovers information modulated onto an RF carrier and provides the information to the RX processor 356. The TX processor 368 and the RX processor 356 implement Layer 1 functionality associated with various signal processing functions. The RX processor 356 may perform spatial processing on the information to recover any spatial streams destined for the UE 304. If multiple spatial streams are destined for the UE 304, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 302. These soft decisions may be based on channel estimates computed by the channel estimator 358. The soft decisions are then decoded and de-interleaved to recover the data and control signals that were originally transmitted by the base station 302 on the physical channel. The data and control signals are then provided to the controller/processor 359, which implements Layer 3 and Layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 302, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator 358 from a reference signal or feedback transmitted by the base station 302 may be used by the TX processor 368 to select the appropriate coding and modulation schemes, and to facilitate spatial processing. The spatial streams generated by the TX processor 368 may be provided to different antenna 352 via separate transmitters 354*b*. Each transmitter 354*b* may modulate an RF carrier with a respective spatial stream for transmission. In an aspect, the transmitters 354*b* and the receivers 354*a* may be one or more transceivers, one or more discrete transmitters, one or more discrete receivers, or any combination thereof.

The UL transmission is processed at the base station 302 in a manner similar to that described in connection with the receiver function at the UE 304. Each receiver 318*b* receives a signal through its respective antenna 320. Each receiver 318*b* recovers information modulated onto an RF carrier and provides the information to a RX processor 370. In an aspect, the transmitters 318*a* and the receivers 318*b* may be one or more transceivers, one or more discrete transmitters, one or more discrete receivers, or any combination thereof.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 304. IP packets from the controller/processor 375 may be provided to the core network. The controller/processor 375 is also responsible for error detection.

In an aspect, the UE 304 illustrated in FIG. 3 may be configured to perform the UE operations described herein. For example, the receiver(s) 354*a* may be configured to detect a beam failure of a first downlink beam received at the UE 304 from a base station (e.g., base station 302), the transmitter(s) 354*b* may be configured to send, to the base station, a RACH request identifying one or more candidate downlink beams received at the UE 304 from the base station, and the receiver(s) 354*a* may be configured to receive, from the base station, a response to the RACH request. The response may identify a second downlink beam from the one or more candidate downlink beams to replace the first downlink beam, and may also indicate a type of beam recovery associated with the second downlink beam for which the base station has reserved downlink beam resources.

In an aspect, the base station 302 illustrated in FIGS. 2A and 2B may be configured to perform the base station operations described herein. For example, the receiver(s) 318*b* may be configured to receive, from a UE (e.g., UE 304), a RACH request identifying one or more candidate downlink beams received at the UE from the base station 302, and the transmitter(s) 318*a* may be configured to send, to the UE, a response to the RACH request. The response may identify a second downlink beam from the one or more candidate downlink beams to replace a first downlink beam, and may also indicate a type of beam recovery associated with the second downlink beam for which downlink beam resources have been reserved.

Figure 4A:
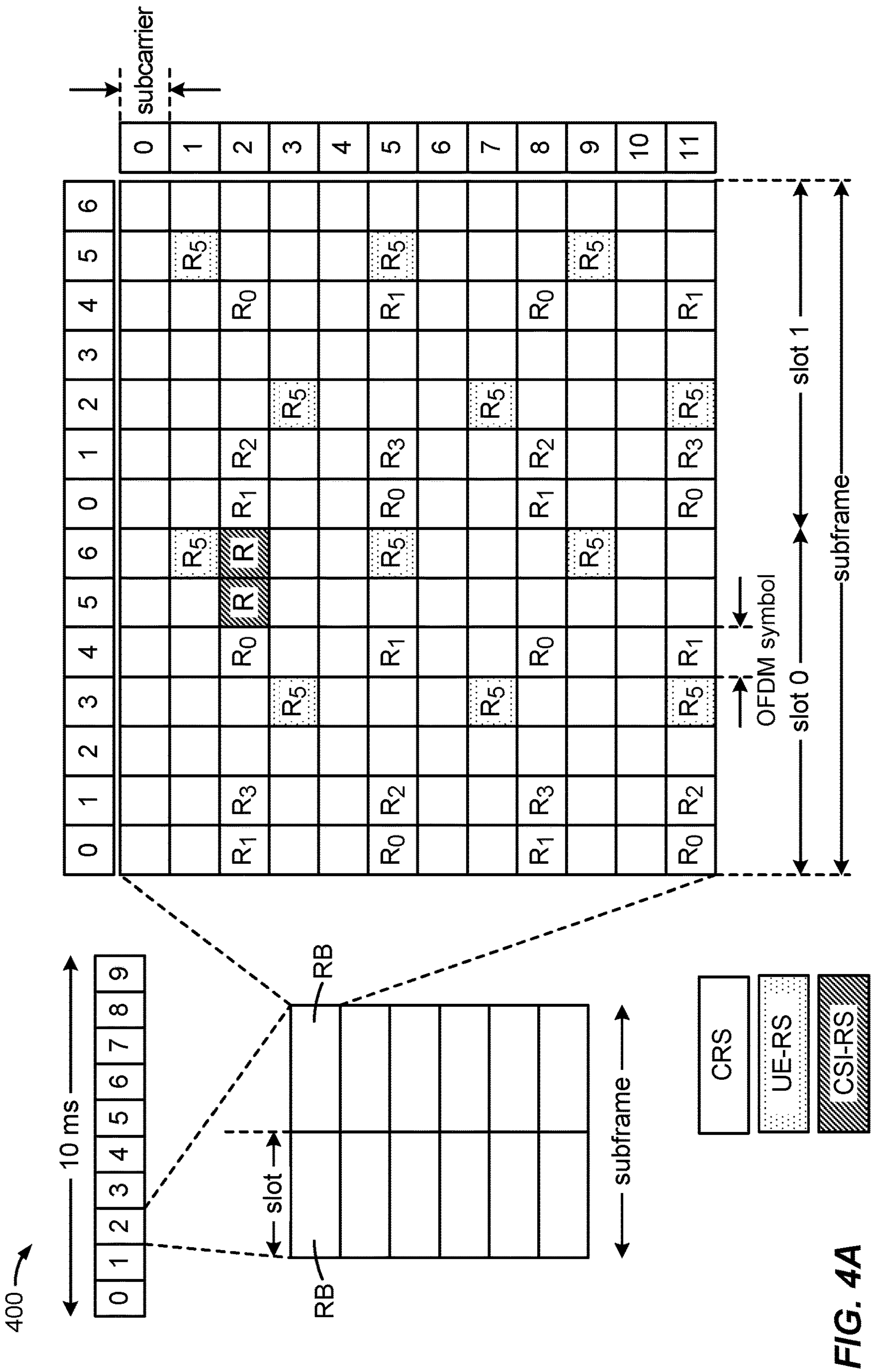
FIGS. 4A to 4D are diagrams illustrating examples of frame structures and channels within the frame structures, according to aspects of the disclosure.
Figure 4B:
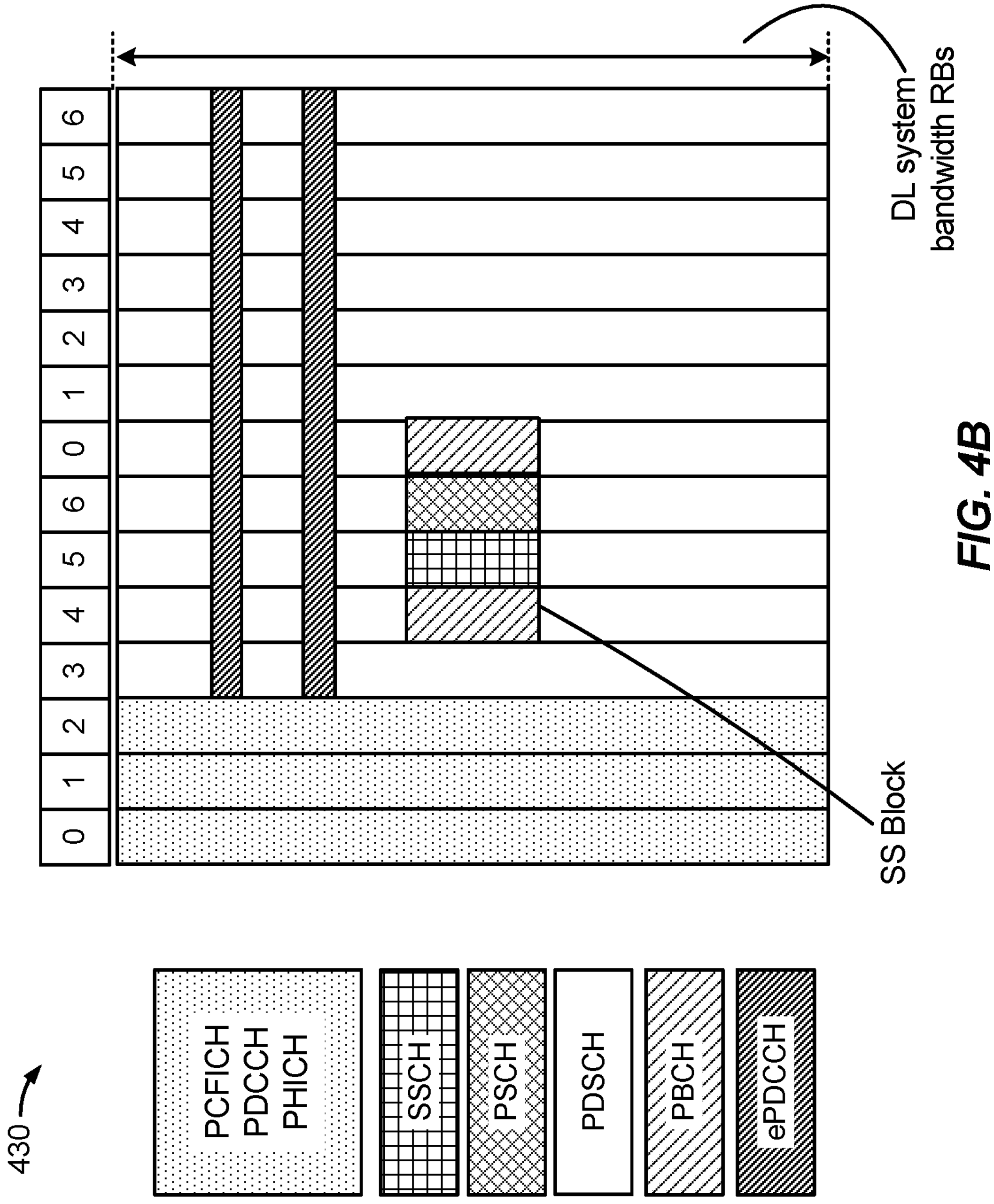
Figure 4C:
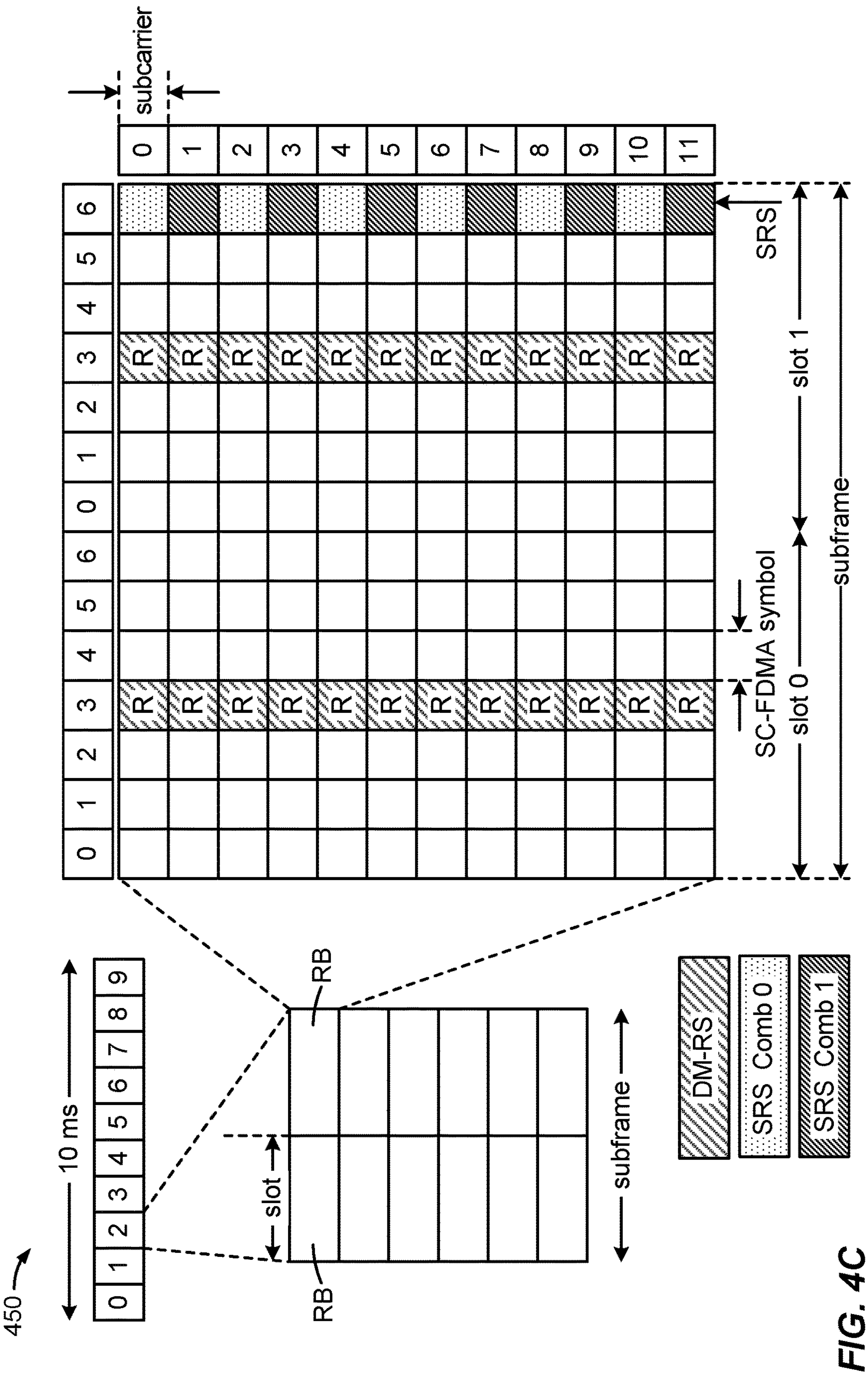
Figure 4D:
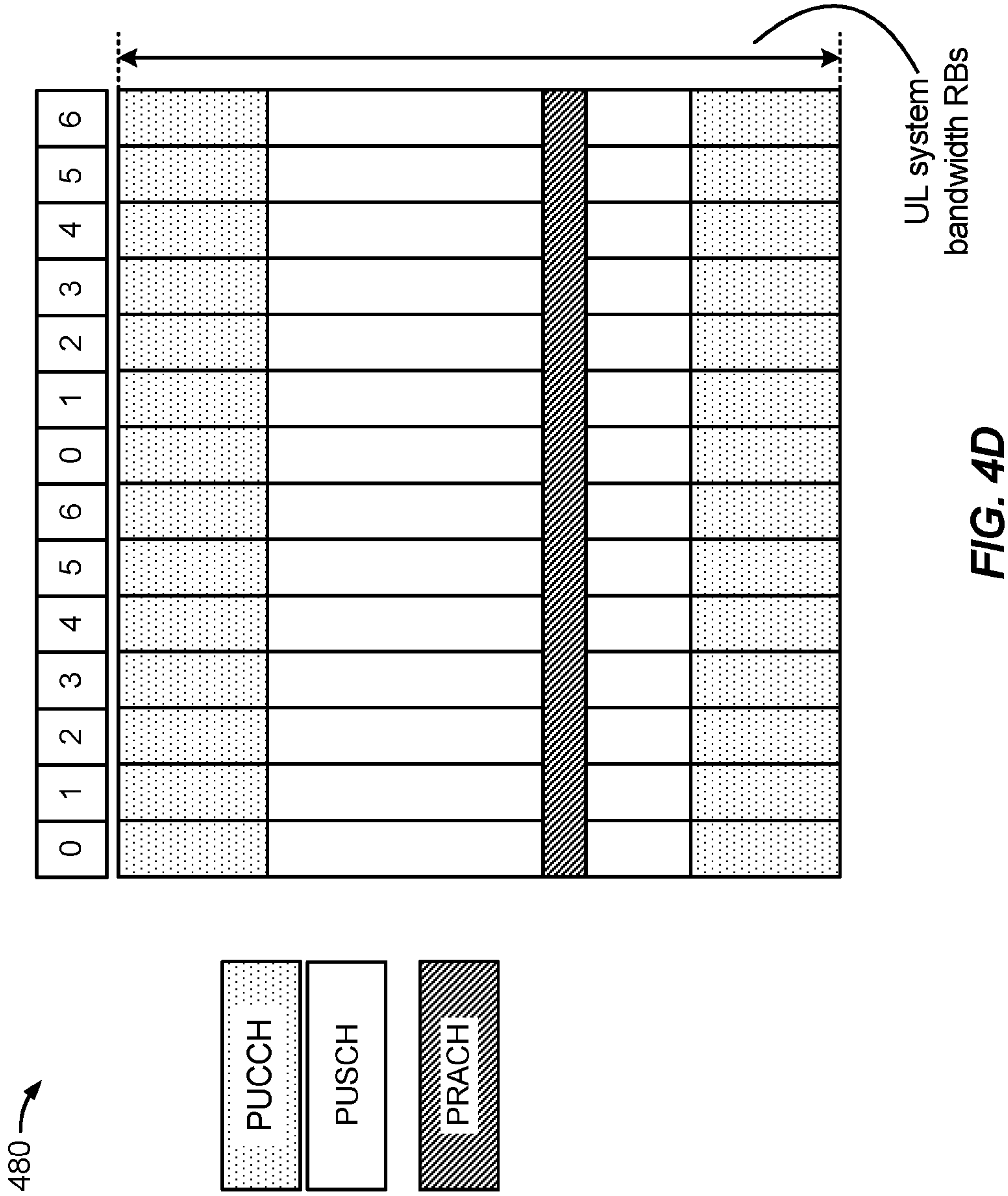

FIG. 4A is a diagram 400 illustrating an example of a DL frame structure, according to aspects of the disclosure. FIG. 4B is a diagram 430 illustrating an example of channels within the DL frame structure, according to aspects of the disclosure. FIG. 4C is a diagram 450 illustrating an example of an UL frame structure, according to aspects of the disclosure. FIG. 4D is a diagram 480 illustrating an example of channels within the UL frame structure, according to aspects of the disclosure. Other wireless communications technologies may have a different frame structures and/or different channels. In the time domain, a frame (10 ms) may be divided into 10 equally sized subframes (1 ms each). Each subframe may include two consecutive time slots (0.5 ms each).

A resource grid may be used to represent the two time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry DL reference (pilot) signals (DL-RS) for channel estimation at the UE. The DL-RS may include cell-specific reference signals (CRS) (also sometimes called "common reference signals"), UE-specific reference signals (UE-RS), and channel state information reference signals (CSI-RS). FIG. 4A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 4B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 4B illustrates a PDCCH that occupies 3 symbols). The PDCCH carries DL control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 4B shows two RB pairs, each subset including one RB pair). The physical HARQ indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 4C, some of the REs carry demodulation reference signals (DMRS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various channels within an UL subframe of a frame, according to aspects of the disclosure. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
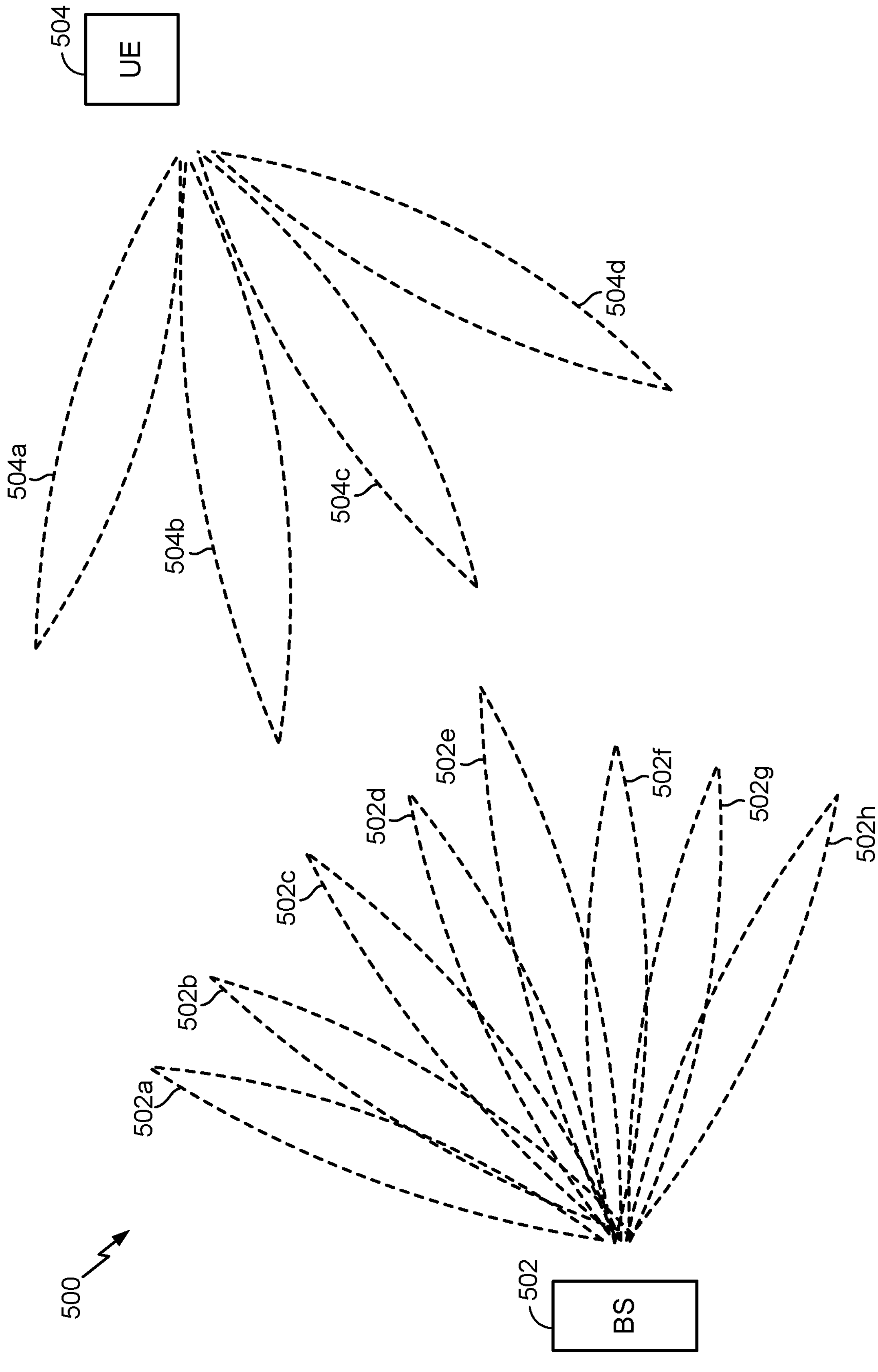
FIG. 5 is a diagram illustrating a base station in communication with a UE, according to aspects of the disclosure.

As noted above, some wireless communications networks, such as NR, may employ beamforming at mmW or near mmW frequencies to increase the network capacity. The use of mmW frequencies may be in addition to microwave frequencies (e.g., in the "sub-6" GHz, or FR1, band) that may also be supported for use in communication, such as when carrier aggregation is used. FIG. 5 is a diagram 500 illustrating a base station 502 in communication with a UE 504, according to aspects of the disclosure. In an aspect, the base station 502 and the UE 504 may correspond to any of the base stations and UEs described herein that are capable of beamforming, such as the base station 180 and UE 182, respectively, in FIG. 1.

Referring to FIG. 5, the base station 502 may transmit a beamformed signal to the UE 504 on one or more beams 502*a*, 502*b*, 502*c*, 502*d*, 502*e*, 502*f*, 502*g*, 502*h*, each having a beam identifier that can be used by the UE 504 to identify the respective beam. Where the base station is beamforming towards the UE 504 with a single array of antennas, the base station 502 may perform a "beam sweep" by transmitting first beam 502*a*, then beam 502*b*, and so on until lastly transmitting beam 502*h*. Alternatively, the base station 502 may transmit beams 502*a*-502*h* in some pattern, such as beam 502*a*, then beam 502*h*, then beam 502*b*, then beam 502*g*, and so on. Where the base station 502 is beamforming towards the UE 504 using multiple arrays of antennas, each antenna array may perform a beam sweep of a subset of the beams 502*a*-502*h*. Alternatively, each of beams 502*a*-502*h* may correspond to a single antenna or antenna array.

The UE 504 may receive the beamformed signal from the base station 502 on one or more receive beams 504*a*, 504*b*, 504*c*, 504*d*. Note that for simplicity, the beams illustrated in FIG. 5 represent either transmit beams or receive beams, depending on which of the base station 502 and the UE 504 is transmitting and which is receiving. Thus, the UE 504 may also transmit a beamformed signal to the base station 502 on one or more of the beams 504*a*-504*d*, and the base station 502 may receive the beamformed signal from the UE 504 on one or more of the beams 502*a*-502*h*. Because communication at high mmW frequencies utilizes directionality (e.g., communication via directional beams 502*a-h* and 504*a-d*) to compensate for higher propagation loss, the base station 502 and the UE 504 may need to align their transmit (and receive) beams during both initial network access and subsequent data transmissions to ensure maximum gain. The base station 502 and the UE 504 may determine the best beams for communicating with each other, and the subsequent communications between the base station 502 and the UE 504 may be via the selected beams.

Thus, the base station 502 and the UE 504 may perform beam training to align the transmit and receive beams of the base station 502 and the UE 504. For example, depending on environmental conditions and other factors, the base station 502 and the UE 504 may determine that the best transmit and receive beams are 502*d* and 504*b*, respectively, or beams 502*e* and 504*c*, respectively. The direction of the best transmit beam for the base station 502 may or may not be the same as the direction of the best receive beam, and likewise, the direction of the best receive beam for the UE 504 may or may not be the same as the direction of the best transmit beam.

However, due to UE mobility/movement, beam reconfiguration at the base station 502, and/or other factors, a DL beam (e.g., comprising a DL control link), which may have been the preferred active beam, may fail to be detected at the UE 504, or the signal quality may fall below a threshold, causing the UE 504 to consider it as a beam/link failure. A beam recovery procedure may be employed to recover from such a beam failure. A beam failure may refer to, for example, failure to detect a strong (e.g., with signal power greater than a threshold) active beam, which may, in some aspects, correspond to a control channel communicating control information from the network. In certain aspects, in order to facilitate beam failure detection, a UE (e.g., UE 504) may be preconfigured with beam identifiers (IDs) of a first set of beams (referred to as "set_q0") to be monitored, a monitoring period, an RSRP threshold, etc. The recovery may be triggered when an RSRP associated with the one or more monitored beams (as detected by the UE 504) falls below a threshold. The recovery process may include the UE 504 identifying a new beam, for example, from a second set of possible beams (corresponding to beam IDs that may be included in a second set, referred to as "set_q1"), and performing a RACH procedure using preconfigured time and frequency resources corresponding to the new preferred beam. The beam IDs corresponding to the beams in the second set of beams (set_q1) may be preconfigured at the UE 504 for use for beam failure recovery purposes. For example, the UE 504 may monitor DL beams (based on the beam IDs and resources identified in the second set), perform measurements, and determine (e.g., based on the measurements) which beam out of all received and measured beams may be the best for reception at the UE 504 from the UE's 504 perspective.

If beam correspondence is assumed (i.e., the direction of the best receive beam used by the UE 504 is also considered the best direction for the transmit beam used by the UE 504), then the UE 504 may assume the same beam configuration for both reception and transmission. That is, based on monitoring DL reference signals from the base station 502, the UE 504 can determine its preferred UL transmit beam weights, which will be the same as for the DL receive beam used for receiving the DL reference signals.

Where beam correspondence is not assumed (e.g., deemed not suitable in the given scenario or for other reasons), the UE 504 may not derive the UL transmit beam from the DL receive beam. Instead, separate signaling is needed to select the UL transmit and DL receive beam weights and for the UL-to-DL beam pairing. The UE 504 may perform a RACH procedure (e.g., using the preconfigured time and frequency resources indicated in the second set of beams, set_q1) to identify the UL transmit beam. Performing the RACH procedure using the preconfigured time and frequency resources may comprise, for example, transmitting a RACH preamble on one or more UL transmit beams (corresponding to the beam IDs in the second set of beams, set_q1) on allocated RACH resources corresponding to the one or more beams. Based on the RACH procedure, the UE 504 may be able to determine and confirm with the base station 502 which UL direction may be the best beam direction for an UL channel (e.g., PUCCH). In this manner, both UL transmit and DL receive beams may be reestablished and beam recovery may be completed.

In certain aspects, carrier aggregation may be utilized where the communication between the base station 502 and the UE 504 is supported by multiple carrier components (e.g., a PCell and one or more SCells). For example, the PCell may correspond to a microwave frequency band and/or other relatively lower frequency band (e.g., an FR1 band or sub-6 band) compared to the mmW frequency band, while the one or more SCells may correspond to mmW frequency bands (e.g., an FR2 band). In an aspect, when PCell and SCell operation is supported in the communications system and there is no correspondence between UL receive and DL transmit beams, assistance from the PCell may be leveraged to enhance an SCell recovery procedure. In other words, if the beam/link failure occurs in the SCell, assistance from the PCell may be leveraged to facilitate the SCell beam recovery procedure. Such an approach may reduce the delays and latencies associated with the beam recovery procedure and allow for faster recovery of a failed link in the SCell.

In the examples illustrated below, for simplicity, the PCell and SCell are shown to be associated with a single base station (e.g., the hardware/circuitry for implementing the PCell and SCell may be collocated at the same base station). However, in some other configurations, the PCell and SCell may be associated with different base stations that may be synchronized.

Figure 6:
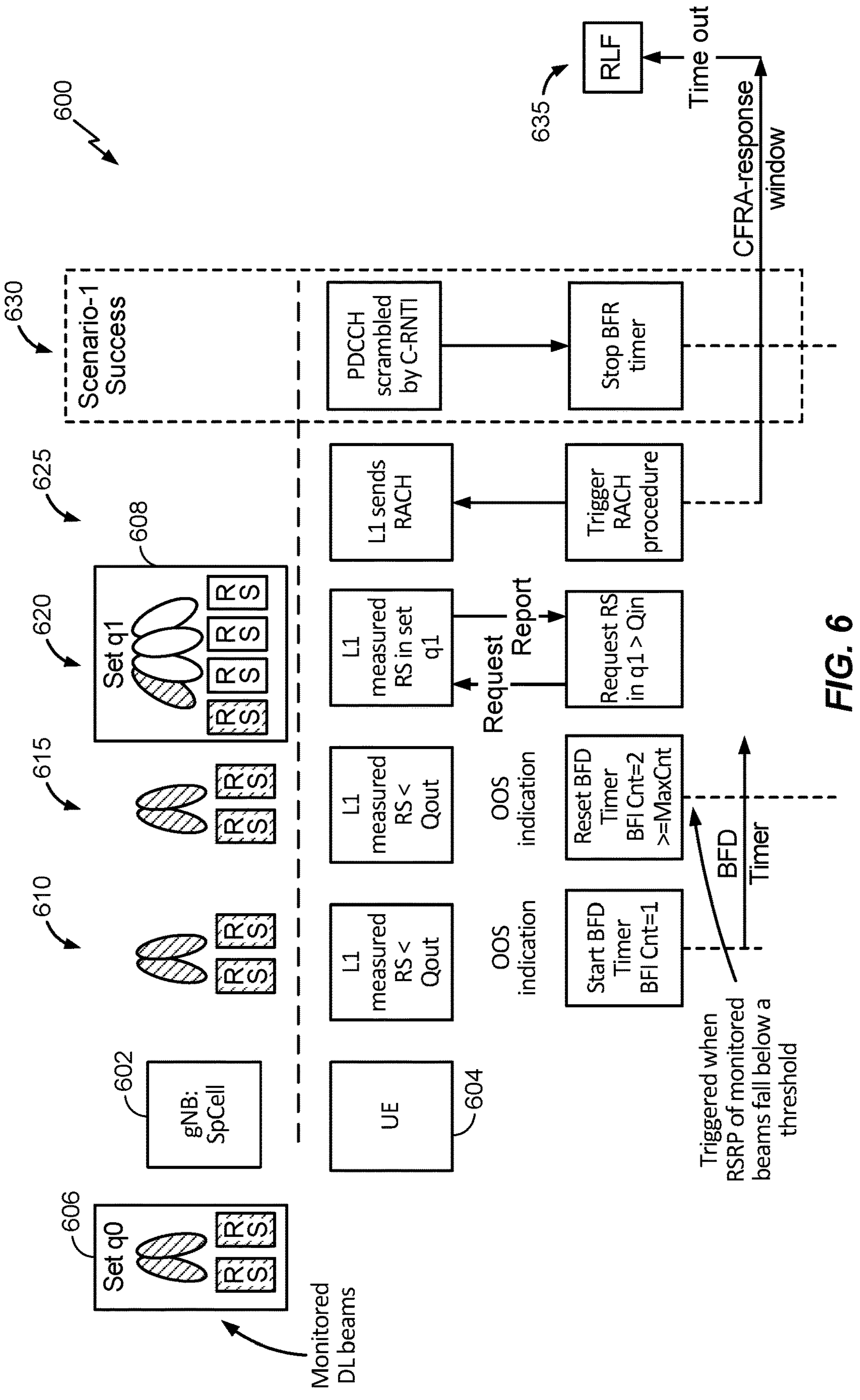
FIG. 6 is a diagram of an exemplary RACH-based SpCell beam failure recovery procedure, according to aspects of the disclosure.

FIG. 6 is a diagram 600 of an exemplary RACH-based SpCell beam failure recovery procedure, according to aspects of the disclosure. In the example of FIG. 6, a PCell or a primary (i.e., in active use) SCell (together referred to as an "SpCell") is supported by a base station 602 (illustrated as a "gNB," and which may correspond to any of the base stations described herein, such as base station 502). A UE 604 (which may correspond to any of the UEs described herein, such as UE 504) monitors the received signal strength (e.g., RSRP) of periodic reference signals transmitted by the base station 602 on a first set ("set_q0") of DL transmit beams 606 of the SpCell. The first set of DL transmit beams 606 may correspond to one or more of beams 502*a-h* in FIG. 5 in the mmW frequency range. The first set of DL transmit beams 606 is referred to as the "failure detection resource set" because the base station 602 sends the beam IDs of the beams in the first set of DL transmit beams 606 to the UE 604 to enable the UE 604 to monitor these beams to determine whether or not the DL control link (i.e., a control channel communicating control information from the network) between the base station 602 and the UE 604 is active. In the example of FIG. 6, the first set of DL transmit beams 606 includes two beams. However, there may be only one beam or more than two beams in the first set of DL transmit beams 606.

At 610, the UE 604 fails to detect a periodic reference signal transmitted on at least one of the beams in the first set of DL transmit beams 606, and/or detects that a quality metric (e.g., RSRP) associated with the reference signal has fallen below a signal quality threshold (represented in FIG. 6 as "Qout"). The Qout threshold may be configured by the base station 602. More specifically, the Layer 1 ("L1" in FIG. 6) functionality of the UE 604 (e.g., implemented in the RX processor 356) detects that the measured quality metric of the periodic reference signal is below the Qout threshold, and sends an out-of-sync (OOS) indication to the controller/processor 359 (which implements the Layer 2 and Layer 3 functionality of the UE 604). In response to receiving the OOS indication, the controller/processor 359 of the UE 604 starts a beam failure detection (BFD) timer and initializes a beam failure indicator (BFI) counter to "1."

At 615, the UE 604 again fails to detect the periodic reference signal transmitted on the at least one of the beams in the first set of DL transmit beams 606, and/or again detects that the quality metric associated with the reference signal has fallen below the Qout threshold. Again, more specifically, the Layer 1 functionality of the UE 604 detects that the measured quality metric of the periodic reference signal is below the Qout threshold, and sends another OOS indication to the controller/processor 359. The controller/processor 359 increments the BFI count to "2." Because the BFI count has reached the maximum count ("MaxCnt") threshold while the BFD timer is running, the UE 604 determines that there has been a beam failure of the at least one beam (e.g., a DL control beam) in the first set of DL transmit beams 606. Because there is a failure of a DL control beam (corresponding to the DL control channel communicating control information from the network), the UE 604 assumes that there is also a failure of the corresponding UL control beam (corresponding to the UL control channel for communicating control information to the network). As such, the UE 604 needs to identify a new DL control beam and re-establish an UL control beam.

Thus, at 620, in response to the beam failure detection at 615, the UE 604 initiates a beam failure recovery procedure. More specifically, the controller/processor 359 of the UE 604 requests that the Layer 1 functionality of the UE 604 (implemented by the RX processor 356) identify at least one beam in a second set ("set_q1") of DL transmit beams 608 that carries a periodic reference signal with a received signal strength greater than a signal quality threshold (represented as "Qin"). The second set of DL transmit beams 608 may correspond to one or more of beams 502*a-h* in FIG. 5 in the mmW frequency range. The second set of DL transmit beams 608 is referred to as the "candidate beam reference signal list." The UE 604 may receive both the beam IDs of the beams in the second set of DL transmit beams 608 and the Qin threshold from the base station 602. In the example of FIG. 6, the second set of DL transmit beams 608 includes four beams, one of which (shaded) carries periodic reference signals having a received signal strength greater than the Qin threshold. However, as will be appreciated, there may be more or fewer than four beams in the second set of DL transmit beams 608, and there may be more than one beam that meets the Qin threshold. The RX processor 356 reports the identified candidate beam to the controller/processor 359. The identified candidate beam can then be used as the new DL control beam, although not necessarily immediately.

At 625, to re-establish an UL control beam, the UE 604 performs a RACH procedure on the one or more candidate DL transmit beams identified at 620 (one in the example of FIG. 6). More specifically, the controller/processor 359 instructs the RX processor 356 to send a RACH preamble (which may be pre-stored or provided to the UE 604 by the base station 602) to the base station 602. The RX processor 356 sends the RACH preamble (also referred to as a Message 1 ("Msg1")) on one or more UL transmit beams corresponding to the one or more candidate DL transmit beams identified at 620 on preconfigured RACH resources for the one or more candidate UL transmit beams. The preconfigured RACH resources may correspond to the SpCell (e.g., in the mmW band). Although not illustrated in FIG. 6, at 625, the UE 604 also starts a beam failure recovery (BFR) timer that defines a contention-free random access (CFRA) window.

The one or more candidate DL transmit beams identified at 620 can include beams that are different than the DL transmit beam associated with the beam failure. As used herein, a "beam" is defined by beam weights associated with an antenna array of the UE 604. Hence, in some aspects, whether used for UL transmission by the UE 604 or DL reception by the UE 604, the weights applied to each antenna in the array to construct the transmitted or received beam define the beam. As such, the one or more candidate UL transmit beams on which the RACH preamble is sent may have different weights than the DL transmit beam associated with the beam failure, even if such candidate UL transmit beam is in generally a similar direction as the DL transmit beam indicated to be failing.

At 630, the base station 602 transmits a response (referred to as a "Msg1 response") to the UE 604 with a cell-radio network temporary identifier (C-RNTI) via a PDCCH associated with the SpCell. For example, the response may comprise cyclic redundancy check (CRC) bits scrambled by the C-RNTI. After the RX processor 356 of the UE 604 processes the received response with the C-RNTI via the SpCell PDCCH from the base station 602 and determines that the received PDCCH is addressed to the C-RNTI, the controller/processor 359 determines that the beam failure recovery procedure has completed and stops the BFR timer started at 625. In an aspect, the C-RNTI may be mapped to a beam direction determined by the base station 602 to be the best direction for an UL channel (e.g., PUCCH) for the UE 604. Accordingly, upon receipt of the response with C-RNTI from the base station 602, the UE 604 may be able to determine the optimal UL transmit beam that is best suited for the UL channel.

The operations at 630 are part of a first scenario in which the UE 604 successfully recovers from the beam failure detected at 615. However, such a recovery may not always occur, or at least not before the BFR timer started at 625 times out. If the BFR timer expires before the beam failure recovery procedure completes successfully, then at 635, the UE 604 determines that a radio link failure (RLF) has occurred.

In the example of FIG. 6, the SCell beam recovery procedure is completed without assistance from the PCell. An issue with the beam failure recovery procedure described with reference to FIG. 6 is that the base station 602 and UE 604 may need to repeat operations 620 to 630 an unknown number of times to determine the UL transmit beam that is best suited for the UL channel. Additionally, dedicated RACH resources may be needed on the SCell and additional overhead (e.g., due to RACH messages and signaling) may also be associated. While the dedicated RACH resources may be used by the UE 604 in the event of beam failure recovery, at other times the dedicated resources are held up for no reason and are not usable for other purposes, which is an undesirable effect. As such, a more efficient beam failure recovery procedure would be beneficial.

As noted above, when PCell and SCell operation is supported in a communications system and there is no correspondence between UL and DL beams, assistance from the PCell can be leveraged to enhance an SCell recovery procedure. For example, beam failure detection can be performed based on a virtual control resource set (CORESET) in the SCell, and the CORESET beam (of Type D spatial QCL) could be the PDSCH beam (of Type D spatial QCL). More specifically, in some scenarios, the actual control signaling for scheduling the PDSCH can occur through the PCell. Thus, in order to detect a control signal failure in the SCell, reference signals in the SCell are used with the above-noted QCL assumptions to serve as virtual CORESETs.

Figure 7:
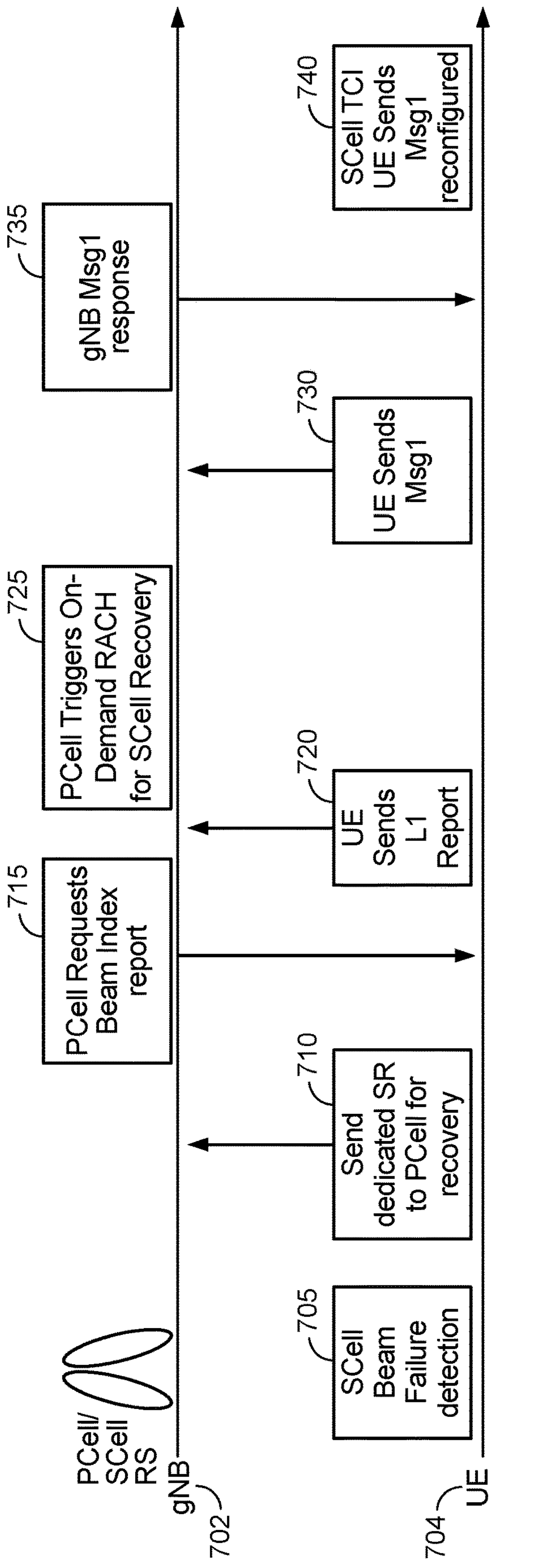
FIG. 7 is a diagram of an exemplary SCell beam recovery procedure with PCell assistance and without assuming any beam correspondence, in accordance with aspects of the disclosure.

FIG. 7 is a diagram 700 of an exemplary SCell beam recovery procedure with PCell assistance and without assuming any beam correspondence, according to aspects of the disclosure. The procedure illustrated in FIG. 7 may be performed by a base station 702 (illustrated as a "gNB") and a UE 704, which may correspond to any of the base stations and UEs described herein.

In the example beam recovery procedure of FIG. 7, the beam recovery CORESET (for beam recovery in the SCell) may not be activated unless needed, and thus, the beam recovery resources are not blocked from being used by the base station 702 for other purposes. Thus, the example beam recovery procedure of FIG. 7 may facilitate on-demand activation of RACH resources for the SCell via the PCell.

At 705, the UE 704 detects an SCell DL transmit beam failure, as described above with reference to 610 and 615 of FIG. 6. Upon the detection of the SCell DL transmit beam failure, the UE 704 may trigger a beam recovery procedure.

At 710, the UE 704 sends a special scheduling request (SR) via the PCell (which may operate on a sub-6 GHz frequency band) to the base station 702. The scheduling request may be a specifically configured SR for SCell beam failure recovery procedures, and may provide an indication to the base station 702 via the PCell that the SCell DL transmit beam failure has occurred.

At 715, in response to receiving the special SR, the base station 702, via the PCell, requests a beam index report from the UE 704. Specifically, the base station 702 may transmit a specialized PDCCH order, for example, a specially configured message transmitted via the PCell, that includes a request for a Layer 1 RSRP report for SCell DL transmit beams and/or a request for reporting a beam ID corresponding to a preferred DL transmit beam as determined by the UE 704.

At 720, in response to the request for the beam index report for SCell DL transmit beams, and based on the information regarding the beam IDs and corresponding resources, the UE 704 measures DL reference signals (e.g., synchronization signal blocks (SSBs) and/or other reference signals) communicated via DL transmit beams to identify the best/preferred DL transmit beam direction, as discussed above with respect to 620 of FIG. 6. The UE 704 may generate a Layer 1 RSRP report for the DL transmit beams based on the measurements. Also, based on the measurements, the UE 704 may identify a preferred DL transmit beam (or set of beams) for a directional DL channel (e.g., PDCCH). The UE 704 may send the Layer 1 RSRP report and/or the beam ID of the preferred DL transmit beam to the base station 702 via a PUCCH in the PCell.

At 725, based on the received report via the PUCCH in the PCell, the base station 702 triggers on-demand RACH for SCell recovery. For example, the base station 702 may reserve a set of RACH resources associated with the SCell for performing RACH. The set of resources associated with the SCell beam recovery may include resources (e.g., in the frequency band corresponding to the SCell) for transmitting RACH preambles via candidate UL transmit beams.

At 730, the UE 704 performs a RACH procedure on one or more UL transmit beams corresponding to the one or more candidate DL transmit beams identified at 720. More specifically, the UE 704 sends a RACH preamble (which may be pre-stored or provided to the UE 704 by the base station 702) to the base station 702, as described above with reference to 625 of FIG. 6. The UE 704 sends the RACH preamble (i.e., "Msg1") on the one or more candidate UL transmit beams on the RACH resources configured at 725. The configured RACH resources may correspond to the SCell (e.g., in the mmW band).

At 735, the base station 702 transmits a response (referred to as a "Msg1 response" or a "Msg2") to the UE 704 as discussed above with reference to 630 of FIG. 6. After the UE 704 processes the received response, the UE 704 may be able to determine the optimal UL transmit beam that is best suited for the uplink channel.

At 740, the UE 704 reconfigures the transmission configuration indicator (TCI) state for the PUCCH. The reconfiguration of the TCI state confirms that the UL transmit beam identified at 735 is to be used for the PUCCH.

Although the foregoing has described beam failure recovery procedures in which the UE establishes a new UL control beam, as will be appreciated, the techniques described herein are equally applicable to selecting a new UL transmit beam and/or DL receive beam in response to failure of the PCell or SCell. For example, when selecting a new DL receive beam for the PCell or the SCell, in FIG. 7, the Msg1 transmitted at 730 could identify candidate receive beams for the PCell or SCell, and the response at 735 could identify one of those beams to use for the PCell or SCell, rather than identifying an UL control beam. In that case, it is useful for the UE 704 to be able to determine what type of beam recovery the Msg1 response received at 735 is associated with, for example, PCell beam recovery (for the uplink transmit beam and/or the downlink receive beam), SCell beam recovery (for the uplink transmit beam and/or the downlink receive beam), or UL transmit/control beam recovery. More generally, it is useful for the UE to be able to determine the type of beam a message in a beam recovery procedure is associated with, for example, whether the beam is associated with a PCell or an SCell. Additionally or alternatively, it is useful for the UE to be able to determine whether the beam is an uplink beam or a downlink beam. In situations where the beam is associated with an SCell, information about the type of beam associated with the beam recovery procedure can include whether it is a downlink-only beam or a downlink and uplink beam. Furthermore, information relating to whether the SCell is self-scheduled (has its own control resources) or cross-scheduled (does not have its own control resources) may also be included in information relating to the type of beam. To address this issue, the present disclosure proposes three solutions. The first solution is to configure a separate BFR CORESET for each of the different types of beam recoveries, i.e., PCell beam recovery, SCell beam recovery, and/or UL transmit/control beam recovery. The second solution is to configure the same BFR CORESET for each of the different types of beam recovery, but to scramble the PDCCH with different RNTIs for the different types of beam recovery. The third solution is to configure the same BFR CORESET for each of the different types of beam recovery, and to use the same DCI but with additional bits to convey which type of recovery response it is.

Figure 8A:
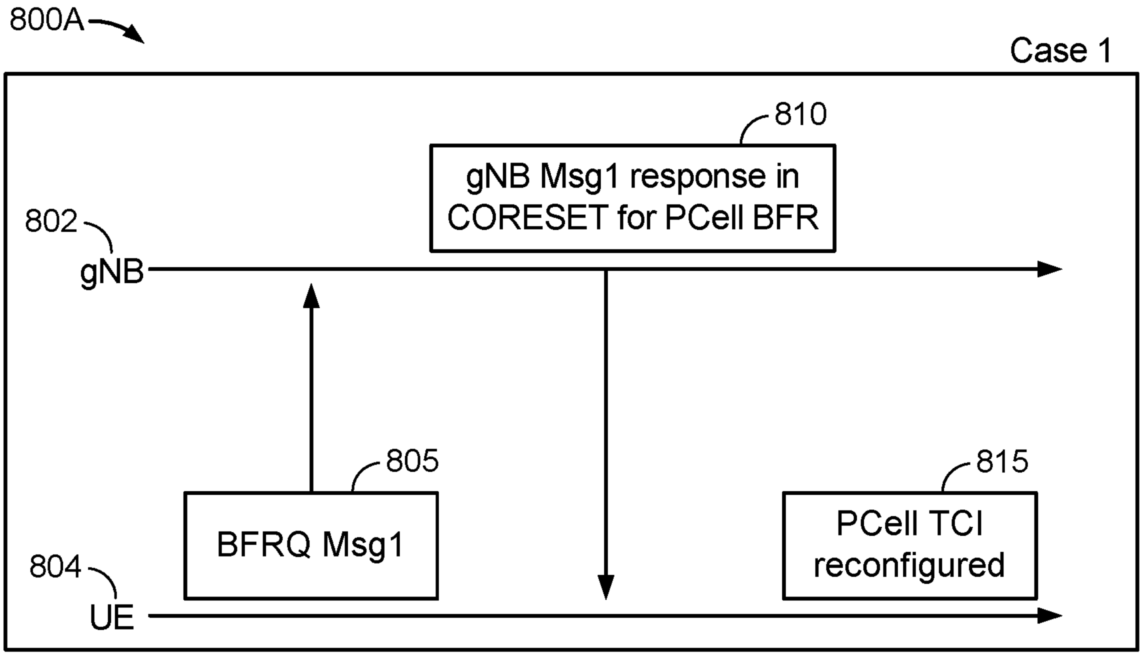
FIGS. 8A and 8B are diagrams illustrating examples of a first solution, according to aspects of the disclosure.

FIG. 8A is a diagram 800A illustrating an example of the first solution, according to aspects of the disclosure. The procedure illustrated in FIG. 8A may be performed by a base station 802 (illustrated as a "gNB") in communication with a UE 804, which may correspond to any of base stations and UEs described herein. In the first solution, the base station 802 reserves unique beam recovery resources (e.g., CORESET) for each use case (e.g., PCell recovery, SCell recovery, or UL beam recovery). That is, the base station 802 reserves a different CORESET for each type of beam recovery (e.g., PCell recovery, SCell recovery, UL beam recovery).

At 805, the UE 804 sends a special beam failure recovery request (BFRQ) Msg1 to the base station 802, similar to the RACH preamble sent at 730 of FIG. 7. The BFRQ Msg1 may be transmitted on one or more candidate UL transmit beams, such as the one or more candidate UL transmit beams corresponding to the one or more candidate DL transmit beams identified at 620/625 of FIG. 6 or 720 of FIG. 7. However, in the example of FIG. 8A, the one or more candidate UL transmit beams are for the PCell rather than an SCell, and are intended to identify a new PCell rather than a new UL transmit/control beam. In addition, rather than simply being transmitted on the candidate beam(s), the BFRQ Msg1 may also specify the type of recovery, here, PCell recovery.

At 810, the base station 802 sends a response to the Msg1 in the CORESET reserved for a PCell beam failure recovery, similar to 630 of FIG. 6 and/or 735 of FIG. 7, except that the recovery is for the PCell DL transmit beam. That is, the type of beam recovery is indicated by an identification of the reserved CORESET. In an aspect, the response indicates the candidate beam determined by the base station 802 to be the best DL transmit beam for the PCell, and for which the base station 802 has reserved resources. Accordingly, upon receipt of the response from the base station 802, the UE 804 uses the identified candidate DL transmit beam as the new beam for the PCell.

At 815, the UE 804 reconfigures the TCI state for the PDCCH (because the recovery is for the PCell, not the UL control beam), similar to 740 of FIG. 7. The reconfiguration of the TCI state confirms that the identified DL transmit beam is to be used for the PDCCH for the PCell.

Figure 8B:
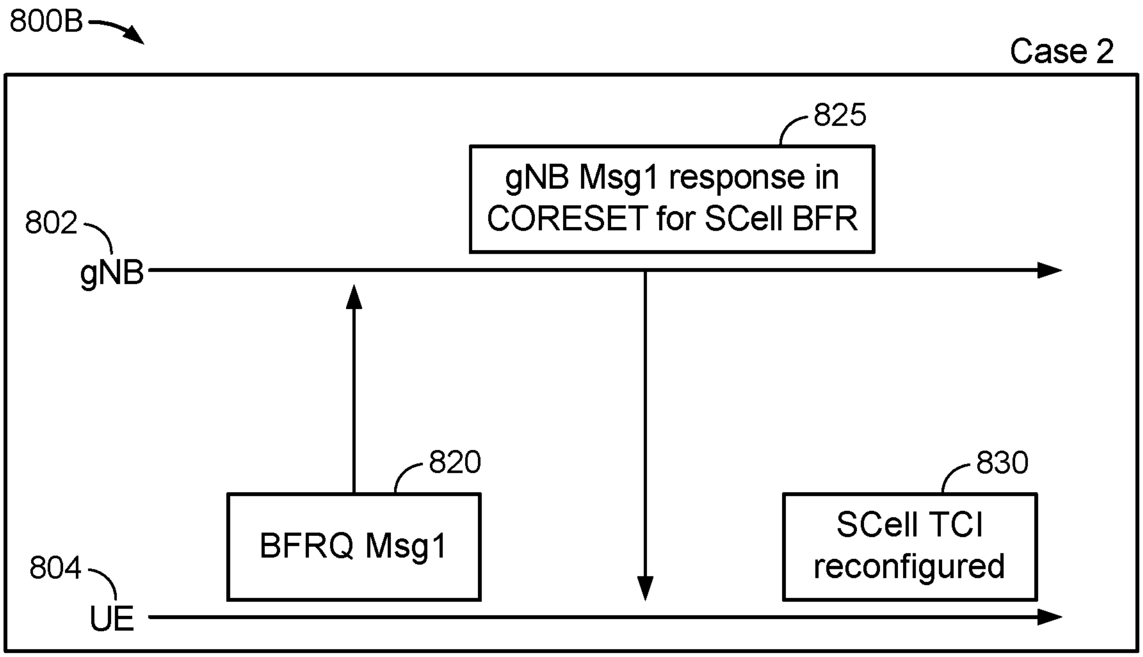

FIG. 8B is a diagram 800B illustrating a second example of the first solution, according to aspects of the disclosure. The procedure illustrated in FIG. 8B may be performed by the base station 802 in communication with the UE 804. At 820, the UE 804 sends a special BFRQ Msg1 to the base station 802, similar to the RACH preamble sent at 730 of FIG. 7. The BFRQ Msg1 may be transmitted on one or more candidate UL transmit beams, such as the one or more candidate UL transmit beams corresponding to the one or more candidate DL transmit beams identified at 620/625 of FIG. 6 or 720 of FIG. 7. However, in the example of FIG. 8B, the one or more candidate UL transmit beams are for the SCell, and are intended to identify a new SCell rather than a new UL transmit beam. In addition, rather than simply being transmitted on the candidate beam(s), the BFRQ Msg1 may also specify the type of recovery, here, SCell recovery.

At 825, the base station 802 sends a response to the Msg1 in the CORESET for a SCell beam failure recovery, similar to 630 of FIG. 6 and/or 735 of FIG. 7, except that the recovery is for the SCell DL transmit beam. In an aspect, the response indicates the candidate beam determined by the base station 802 to be the best DL transmit beam for the SCell, and for which the base station 802 has reserved resources. Accordingly, upon receipt of the response from the base station 802, the UE 804 uses the identified candidate DL transmit beam as the new beam for the SCell.

At 830, the UE 804 reconfigures the TCI state for the PDCCH (because the recovery is for the SCell, not the UL control beam), similar to 740 of FIG. 7. The reconfiguration of the TCI state confirms that the identified DL transmit beam is to be used for the PDCCH for the SCell.

Figure 9A:
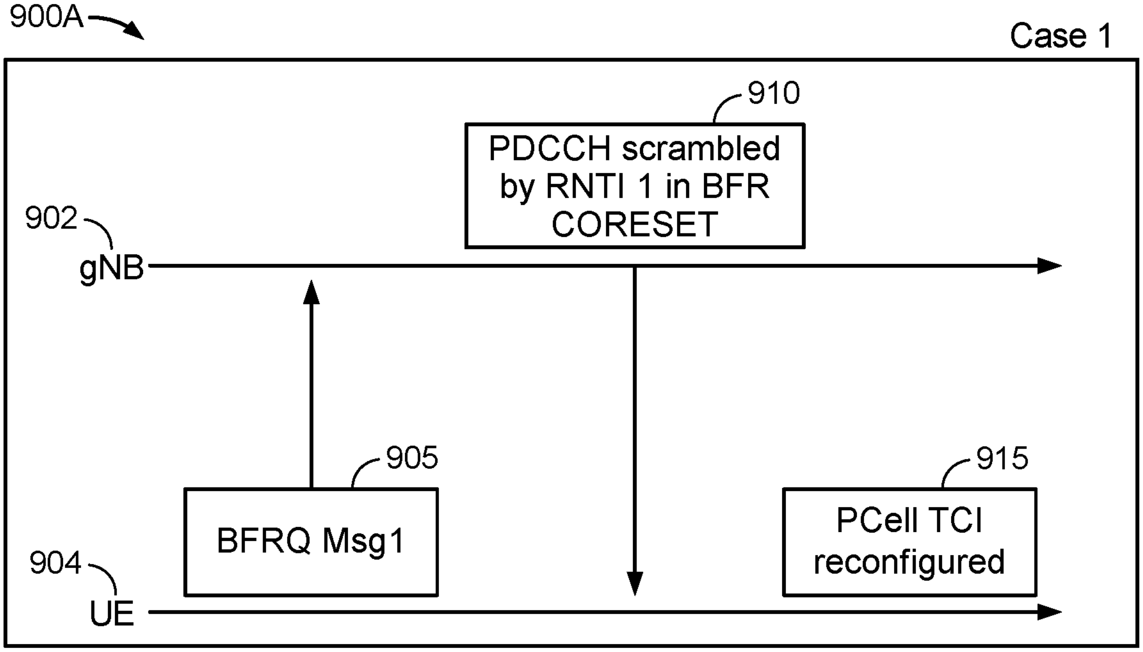
FIGS. 9A and 9B are diagrams illustrating examples of a second solution, according to aspects of the disclosure.

FIG. 9A is a diagram 900A illustrating an example of the second solution, according to aspects of the disclosure. The procedure illustrated in FIG. 9A may be performed by a base station 902 (illustrated as a "gNB") in communication with a UE 904, which may correspond to any of base stations and UEs described herein. In the second solution, the base station 902 configures the same beam failure recovery CORESET, but scrambles the PDCCH with different RNTIs for the different types of recovery (e.g., PCell, SCell, or UL control beam). In that way, the same beam recovery resources (e.g., RACH resources) can be used, but with different scrambling sequences for each use case (e.g., PCell recovery, SCell recovery, or UL beam recovery).

At 905, the UE 904 sends a special BFRQ Msg1 to the base station 902, similar to the BFRQ Msg1 sent at 805 of FIG. 8A and 820 of FIG. 8B. The BFRQ Msg1 may be transmitted on one or more candidate UL transmit beams, such as the one or more candidate UL transmit beams corresponding to the one or more candidate beams identified at 620/625 of FIG. 6 or 720 of FIG. 7. However, in the example of FIG. 9A, the one or more candidate beams are for the PCell rather than an SCell, and are intended to identify a new PCell rather than a new UL transmit beam for the SCell. In addition, rather than simply being transmitted on the candidate beam(s), the BFRQ Msg1 may also specify the type of recovery, here, PCell recovery.

At 910, the base station 902 sends a response to the Msg1 in the CORESET for a PCell beam failure recovery, similar to 630 of FIG. 6 and/or 735 of FIG. 7, except that the recovery is for the PCell DL transmit beam. In an aspect, the response may comprise the PDCCH scrambled by an RNTI corresponding to the type of recovery (e.g., PCell recovery, SCell recovery, or UL beam recovery). The UE 904 may be informed of the particular RNTI in order to decode the response. Because the RNTI is different for each type of recovery, any type of beam failure recovery procedure can reuse the same resources (e.g., RACH resources). In an aspect, the response indicates the candidate beam determined by the base station 902 to be the best DL transmit beam for the PCell, and for which the base station 902 has reserved resources. Accordingly, upon receipt of the response from the base station 902, the UE 904 uses the identified candidate DL transmit beam as the new beam for the PCell.

At 915, the UE 904 reconfigures the TCI state for the PDCCH (because the recovery is for the PCell, not the UL control beam), similar to 740 of FIG. 7. The reconfiguration of the TCI state confirms that the identified DL transmit beam is to be used for the PDCCH for the PCell.

Figure 9B:
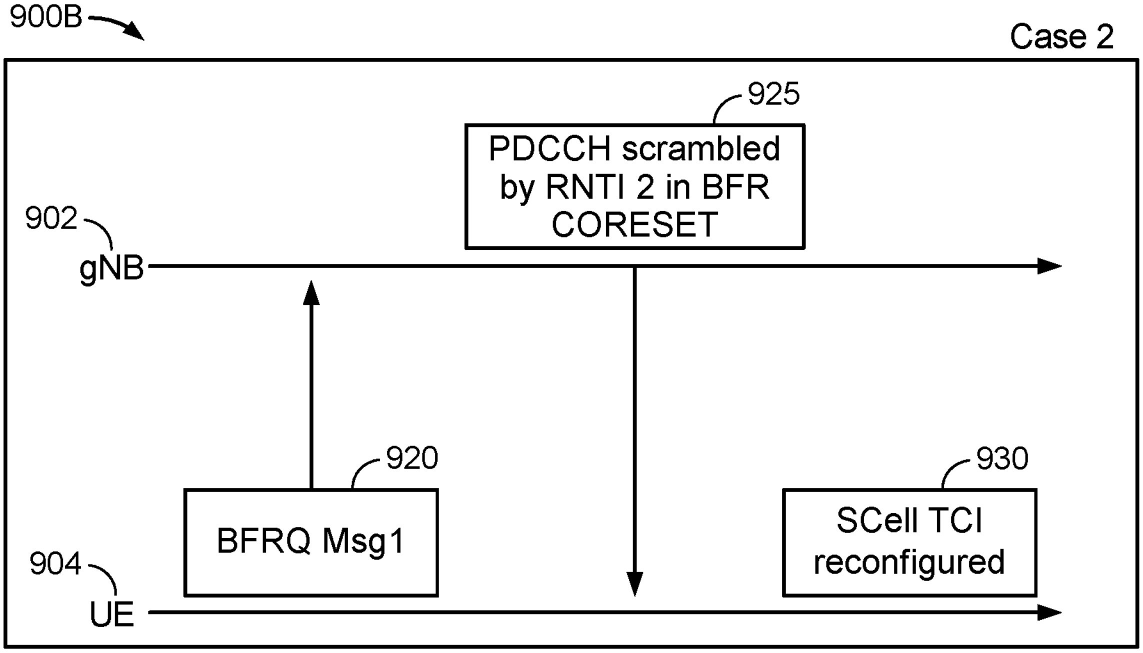

FIG. 9B is a diagram 900B illustrating a second example of the second solution, according to aspects of the disclosure. The procedure illustrated in FIG. 9B may be performed by the base station 902 in communication with the UE 904. At 920, the UE 904 sends a special BFRQ Msg1 to the base station 902, similar to the BFRQ Msg1 sent at 905 of FIG. 9A. The BFRQ Msg1 may be transmitted on one or more candidate UL transmit beams, such as the one or more candidate UL transmit beams corresponding to the one or more candidate beams identified at 620/625 of FIG. 6 or 720 of FIG. 7. However, in the example of FIG. 9B, the one or more candidate beams are for the SCell, and are intended to identify a new DL transmit beam for the SCell rather than a new UL transmit beam for the SCell. In addition, rather than simply being transmitted on the candidate beam(s), the BFRQ Msg1 may also specify the type of recovery, here, SCell recovery.

At 925, the base station 902 sends a response to the Msg1 in the CORESET for a SCell beam failure recovery, similar to 630 of FIG. 6 and/or 735 of FIG. 7, except that the recovery is for the SCell DL transmit beam. In an aspect, the response may comprise the PDCCH scrambled by a different RNTI (from the RNTI in the example of FIG. 9A for PCell recovery). In an aspect, the response indicates the candidate beam determined by the base station 902 to be the best DL transmit beam for the SCell, and for which the base station 902 has reserved resources. Accordingly, upon receipt of the response from the base station 902, the UE 904 uses the identified candidate DL transmit beam as the new beam for the SCell.

At 930, the UE 904 reconfigures the TCI state for the PDCCH (because the recovery is for the SCell, not the UL control beam), similar to 740 of FIG. 7. The reconfiguration of the TCI state confirms that the identified DL transmit beam is to be used for the PDCCH for the SCell.

Figure 10A:
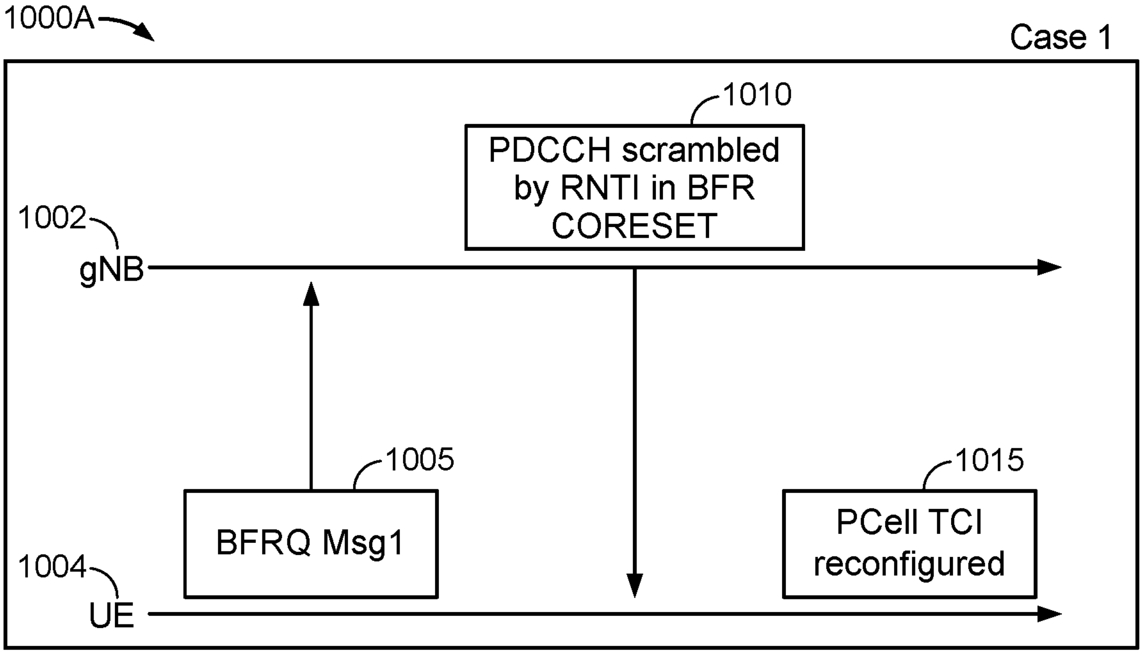
FIGS. 10A and 10B are diagrams illustrating examples of a third solution, according to aspects of the disclosure.

FIG. 10A is a diagram 1000A illustrating an example of the third solution, according to aspects of the disclosure. The procedure illustrated in FIG. 10A may be performed by a base station 1002 (illustrated as a "gNB") in communication with a UE 1004, which may correspond to any of base stations and UEs described herein. In the third solution, the base station 1002 configures the same beam failure recovery CORESET for each type of recovery and uses the same DCI, but adds additional bits to the DCI to convey the type of recovery. For example, the base station 1002 can reuse the carrier indicator field (CIF) used for carrier scheduling, or some other similar mechanism.

At 1005, the UE 1004 sends a special BFRQ Msg1 to the base station 1002, similar to the BFRQ Msg1 sent at 905 of FIG. 9A and 920 of FIG. 9B. The BFRQ Msg1 may be transmitted on one or more candidate UL transmit beams, such as the one or more candidate UL transmit beams corresponding to the one or more candidate beams identified at 620/625 of FIG. 6 or 720 of FIG. 7. However, in the example of FIG. 10A, the one or more candidate beams are for the PCell rather than an SCell, and are intended to identify a new DL transmit beam for the Cell rather than a new UL transmit beam for the SCell. In addition, rather than simply being transmitted on the candidate beam(s), the BFRQ Msg1 may also specify the type of recovery, here, PCell recovery.

At 1010, the base station 1002 sends a response to the Msg1 in the CORESET for a PCell beam failure recovery, similar to 630 of FIG. 6 and/or 735 of FIG. 7, except that the recovery is for the PCell DL transmit beam. In an aspect, the response may comprise the PDCCH scrambled by an RNTI. In an aspect, the RNTI is the same for each type of recovery (e.g., PCell recovery, SCell recovery, or UL beam recovery) so that any beam failure recovery procedure can reuse the same resources (e.g., RACH resources). In addition, the DCI in the response may be the same for each type of recovery. To differentiate the recovery type, the base station 1002 adds additional bits to the response that are different depending on the type of recovery. The UE 1004 may be informed of the mapping of these additional bits to the different types of recovery in order to decode the response. In an aspect, the response indicates the candidate beam determined by the base station 1002 to be the best DL transmit beam for the PCell, and for which the base station 1002 has reserved resources. Accordingly, upon receipt of the response from the base station 1002, the UE 1004 uses the identified candidate DL transmit beam as the new beam for the PCell.

At 1015, the UE 1004 reconfigures the TCI state for the PDCCH (because the recovery is for the PCell, not the UL control beam), similar to 740 of FIG. 7. The reconfiguration of the TCI state confirms that the identified DL transmit beam is to be used for the PDCCH for the PCell.

Figure 10B:
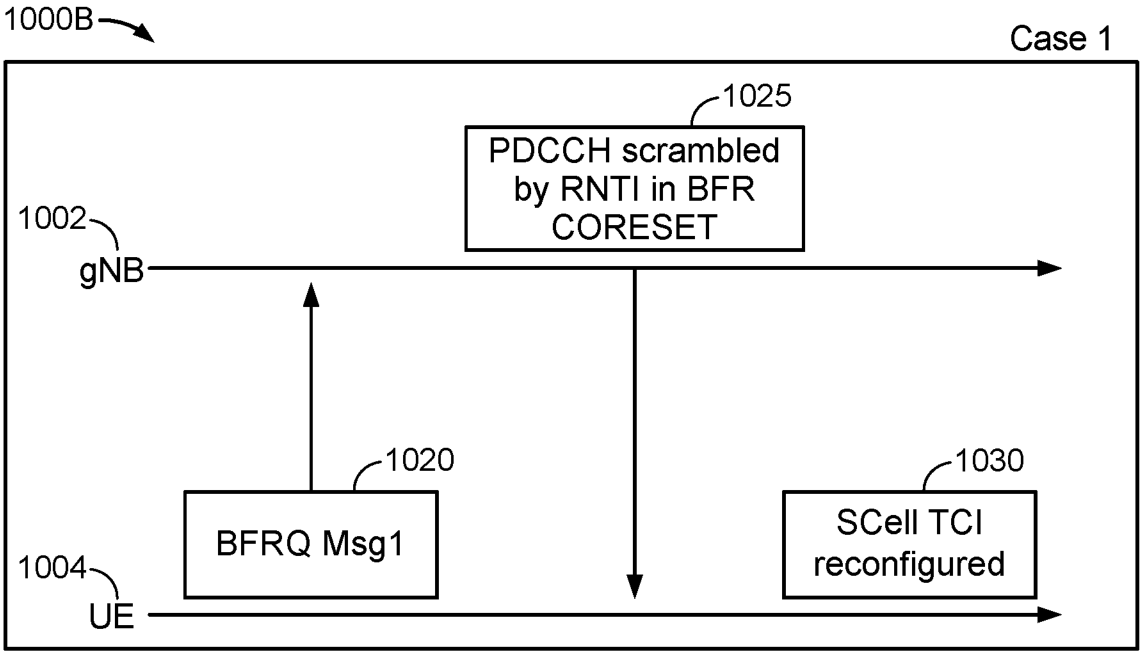

FIG. 10B is a diagram 1000B illustrating an example of the third solution, according to aspects of the disclosure. The procedure illustrated in FIG. 10B may be performed by the base station 1002 in communication with the UE 1004. At 1020, the UE 1004 sends a special BFRQ Msg1 to the base station 1002, similar to the BFRQ Msg1 sent at 1005 of FIG. 10A. The BFRQ Msg1 may be transmitted on one or more candidate UL transmit beams, such as the one or more candidate UL transmit beams corresponding to the one or more candidate beams identified at 620/625 of FIG. 6 or 720 of FIG. 7. However, in the example of FIG. 10B, the one or more candidate beams are for the SCell, and are intended to identify a new DL transmit for the SCell rather than a new UL transmit beam for the SCell. In addition, rather than simply being transmitted on the candidate beam(s), the BFRQ Msg1 may also specify the type of recovery, here, SCell recovery.

At 1025, the base station 1002 sends a response to the Msg1 in the CORESET for an SCell beam failure recovery, similar to 630 of FIG. 6 and/or 735 of FIG. 7, except that the recovery is for the SCell transmit beam. In an aspect, the response may comprise the PDCCH scrambled by the same RNTI as in FIG. 10A, with the same DCI bits, but with additional bits to differentiate SCell recovery from PCell recovery. In an aspect, the response indicates the candidate beam determined by the base station 1002 to be the best DL transmit beam for the PCell, and for which the base station 1002 has reserved resources. Accordingly, upon receipt of the response from the base station 1002, the UE 1004 uses the identified candidate DL transmit beam as the new beam for the SCell.

At 1030, the UE 1004 reconfigures the TCI state for the PDCCH (because the recovery is for the SCell, not the UL control beam), similar to 740 of FIG. 7. The reconfiguration of the TCI state confirms that the identified DL transmit beam is to be used for the PDCCH for the SCell.

Figure 11:
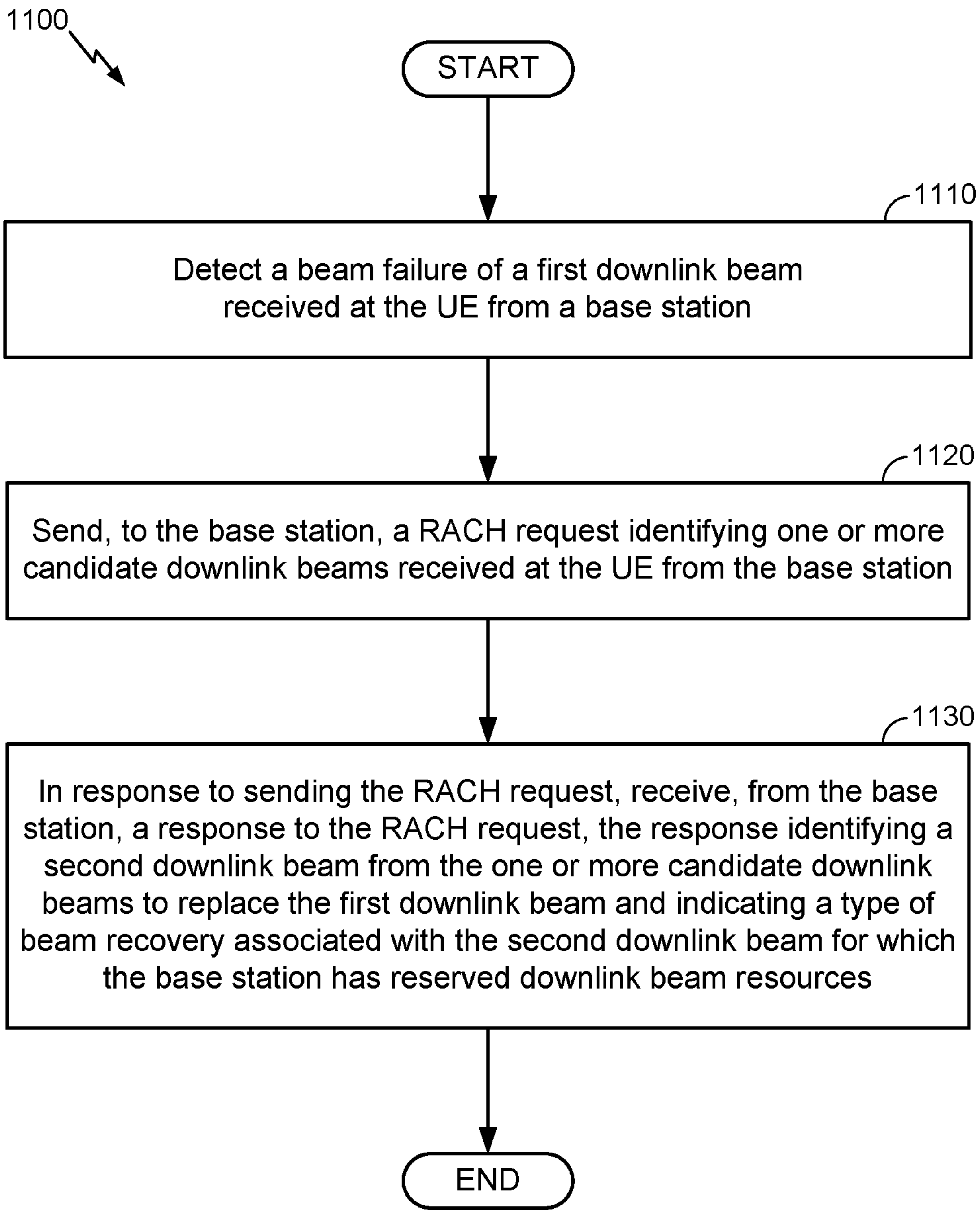
FIGS. 11 and 12 illustrate exemplary methods of beam failure recovery in a wireless communications system according to aspects of the disclosure.

FIG. 11 illustrates an exemplary method 1100 of beam failure recovery in a wireless communications system, such as wireless communications system 100, according to aspects of the disclosure. The method 1100 may be performed by a UE, such as any of the UEs described herein.

At 1110, the UE (e.g., RX processor 356 via receiver(s) 354) detects a beam failure of a first downlink (transmit) beam received at the UE from a base station (e.g., any of the base stations described herein), as at 610 and 615 of FIG. 6 and 705 of FIG. 7. The first downlink beam may be associated with a PCell or an SCell supported by the base station.

At 1120, the UE (e.g., TX processor 368 via transmitter(s) 354) sends, to the base station, a RACH request identifying one or more candidate downlink beams received at the UE from the base station, as at 730 of FIG. 7, 805 of FIG. 8A, 820 of FIG. 8B, 905 of FIG. 9A, 920 of FIG. 9B, 1005 of FIG. 10A, and 1020 of FIG. 10B. The RACH request may be sent using an uplink beam different than the uplink beam associated with the beam failure. As such, in one example, the beam failure indication can be sent using the same weights for receiving a candidate beam (from the one or more candidate beams) having different weights than the downlink beam indicated to be failing, even if such candidate beam is in generally a similar direction as the downlink beam indicated to be failing. Additionally or alternatively, the beam failure indication may be sent using a different carrier frequency and/or different resources than the downlink beam associated with the beam failure. The one or more candidate downlink beams included in the RACH request may, in some implementations, have been previously indicated by the base station and stored in, for example, BeamFailureRecoveryConfig parameter(s) in the RRC layer. Such beam failure recovery parameters can be received from the base station in a unicast message using the PDCCH or PDSCH or broadcast in the PDSCH. In various examples, contention-free RACH information can be carried in the broadcast PDSCH.

At 1130, in response to sending the RACH request, the UE (e.g., RX processor 356 via receiver(s) 354) receives, from the base station, a response to the RACH request, the response identifying a second downlink beam from the one or more candidate downlink beams to replace the first downlink beam and indicating a type of beam recovery associated with the second downlink beam for which the base station has reserved downlink beam resources, as at 735 of FIG. 7, 810 of FIG. 8A, 825 of FIG. 8B, 910 of FIG. 9A, 925 of FIG. 9B, 1010 of FIG. 10A, and 1025 of FIG. 10B.

Figure 12:
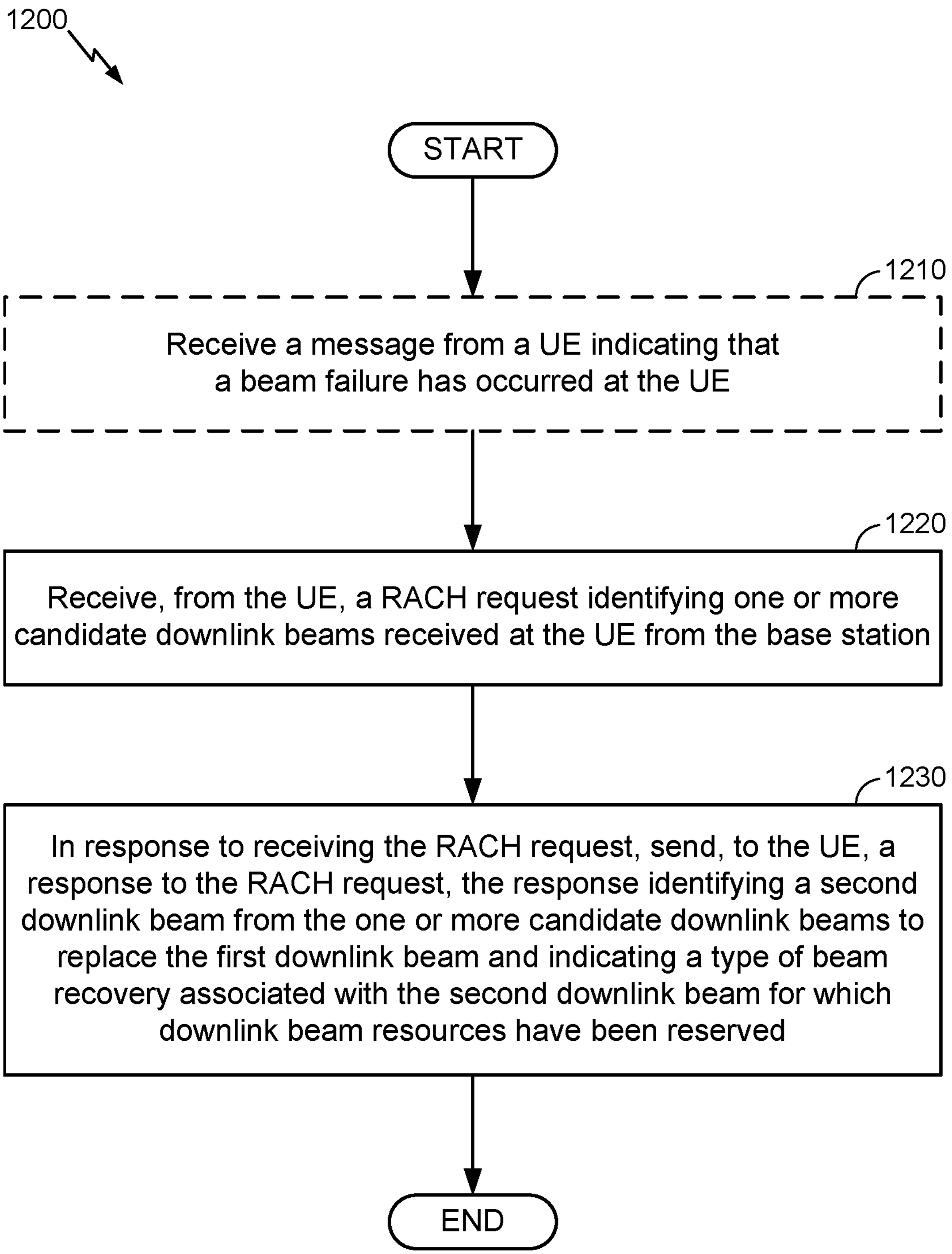

FIG. 12 illustrates an exemplary method 1200 of beam failure recovery in a wireless communications system, such as wireless communications system 100, according to aspects of the disclosure. The method 1200 may be performed by a base station, such as any of the base stations described herein.

At 1210, the base station (e.g., RX processor 370 via receiver(s) 318) optionally receives a message from a UE (e.g., any of the UEs described herein) indicating that a beam failure has occurred at the UE, as at 710 of FIG. 7. The beam failure may be a failure of a DL transmit beam associated with a PCell supported by the base station or an SCell supported by the base station. Operation 1210 is optional because the UE need not send a message indicating that a beam failure has occurred, but rather, can simply send a RACH request, as at 1220. As noted above with reference to 1120, like the RACH request, the message indicating that a beam failure has occurred can be sent using a beam different than the beam associated with the beam failure.

At 1220, the base station (e.g., RX processor 370 via receiver(s) 318) receives, from the UE, a RACH request identifying one or more candidate downlink beams received at the UE from the base station, as at 730 of FIG. 7, 805 of FIG. 8A, 820 of FIG. 8B, 905 of FIG. 9A, 920 of FIG. 9B, 1005 of FIG. 10A, and 1020 of FIG. 10B.

At 1230, in response to receiving the RACH request, the base station (e.g., TX processor 316 via transmitter(s) 318) sends, to the UE, a response to the RACH request, the response identifying a second downlink beam from the one or more candidate downlink beams to replace the first downlink beam and indicating a type of beam recovery associated with the second downlink beam for which downlink beam resources have been reserved, as at 735 of FIG. 7, 810 of FIG. 8A, 825 of FIG. 8B, 910 of FIG. 9A, 925 of FIG. 9B, 1010 of FIG. 10A, and 1025 of FIG. 10B.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for beam failure recovery in a wireless communications system.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of beam failure recovery in a wireless communications system, comprising:

detecting, by a user equipment (UE), a beam failure of a first downlink beam received at the UE from a base station;

sending, by the UE to the base station, a random access channel (RACH) request identifying one or more candidate downlink beams received at the UE from the base station; and receiving, at the UE from the base station, a response to the RACH request, the response identifying a second downlink beam from the one or more candidate downlink beams to replace the first downlink beam and indicating a type of beam recovery associated with the second downlink beam for which the base station has reserved downlink beam resources, wherein the type of beam recovery is included as an indication in a same control resource set (CORESET) for each of a primary cell (PCell) recovery, a secondary cell (SCell) recovery, recovery of an uplink transmit beam associated with the PCell, and recovery of an uplink transmit beam associated with the SCell, and wherein the type of beam recovery is indicated by the same CORESET, the same downlink control information (DCI), and different additional bits to distinguish each of the PCell recovery, the SCell recovery, the recovery of the uplink transmit beam associated with the PCell, and the recovery of the uplink transmit beam associated with the SCell.

2. The method of claim 1, wherein the type of beam recovery is indicated by an identification of the same CORESET scrambled with a different radio network temporary identifier (RNTI) for each of the PCell recovery, the SCell recovery, the recovery of the uplink transmit beam associated with the PCell, and the recovery of the uplink transmit beam associated with the SCell.

3. The method of claim 1, wherein the first downlink beam is a downlink transmission beam for an SCell supported by the base station.

4. The method of claim 3, wherein the first downlink beam uses a millimeter wave (mmW) frequency band to transmit periodic reference signals.

5. The method of claim 1, wherein the first downlink beam is a downlink transmission beam for a PCell supported by the base station.

6. The method of claim 5, wherein the first downlink beam uses a mmW frequency band to transmit periodic reference signals.

7. The method of claim 1, further comprising:

receiving, at the UE from the base station, a physical downlink control channel (PDCCH) order;

performing, by the UE, a RACH procedure in response to the PDCCH order, wherein the RACH procedure includes sending the RACH request and receiving the response to the RACH request; and determining, by the UE, an uplink transmit beam based on the RACH procedure.

8. The method of claim 7, wherein the uplink transmit beam is associated with a SCell supported by the base station.

9. The method of claim 7, wherein the uplink transmit beam is associated with a PCell supported by the base station.

10. A method of beam failure recovery in a wireless communications system, comprising:

receiving, at a base station from a user equipment (UE), a random access channel (RACH) request identifying one or more candidate downlink beams received at the UE from the base station; and sending, from the base station to the UE, a response to the RACH request, the response identifying a second downlink beam from the one or more candidate downlink beams to replace a first downlink beam and indicating a type of beam recovery associated with the second downlink beam for which downlink beam resources have been reserved, wherein the type of beam recovery is included as an indication in a same control resource set (CORESET) for each of a primary cell (PCell) recovery, a secondary cell (SCell) recovery, recovery of an uplink transmit beam associated with the PCell, and recovery of an uplink transmit beam associated with the SCell, and wherein the type of beam recovery is indicated by the same CORESET, the same downlink control information (DCI), and different additional bits to distinguish each of the PCell recovery, the SCell recovery, the recovery of the uplink transmit beam associated with the PCell, and the recovery of the uplink transmit beam associated with the SCell.

11. The method of claim 10, further comprising:

receiving, at the base station, a message from the UE indicating that a beam failure has occurred at the UE.

12. The method of claim 11, wherein the message from the UE indicating that the beam failure has occurred comprises a scheduling request (SR).

13. The method of claim 10, wherein the type of beam recovery is indicated by an identification of the same CORESET scrambled with a different radio network temporary identifier (RNTI) for each of the PCell recovery, the SCell recovery, the recovery of the uplink transmit beam associated with the PCell, and the recovery of the uplink transmit beam associated with the SCell.

14. The method of claim 13, wherein the base station reserves the same CORESET for each of the PCell recovery, the SCell recovery, the recovery of the uplink transmit beam associated with the PCell, and the recovery of the uplink transmit beam associated with the SCell.

15. The method of claim 7, wherein the base station reserves the same CORESET for each of the PCell recovery, the SCell recovery, the recovery of the uplink transmit beam associated with the PCell, and the recovery of the uplink transmit beam associated with the SCell.

16. The method of claim 10, wherein the first downlink beam is a downlink transmission beam for an SCell supported by the base station.

17. The method of claim 10, wherein the base station transmits periodic reference signals on the first downlink beam, and wherein the first downlink beam operates on a millimeter wave (mmW) frequency band.

18. The method of claim 10, wherein the first downlink beam is a downlink transmission beam for a PCell supported by the base station.

19. The method of claim 10, further comprising:

sending, by the base station to the UE, a physical downlink control channel (PDCCH) order; and performing, by the base station, a RACH procedure after sending the PDCCH order, wherein the RACH procedure includes receiving the RACH request and sending the response to the RACH request, and wherein the UE determines an uplink transmit beam based on the RACH procedure.

20. The method of claim 10, wherein the uplink transmit beam is associated with a SCell supported by the base station, or wherein the uplink transmit beam is associated with a PCell supported by the base station.

21. An apparatus for beam failure recovery in a wireless communications system, comprising:

one or more processors of a user equipment (UE), the one or more processors, either alone or in combination, configured to:

detect a beam failure of a first downlink beam received at the UE from a base station;

send, to the base station, a random access channel (RACH) request identifying one or more candidate downlink beams received at the UE from the base station; and receive, from the base station, in response to the RACH request being sent, a response to the RACH request, the response identifying a second downlink beam from the one or more candidate downlink beams to replace the first downlink beam and indicating a type of beam recovery associated with the second downlink beam for which downlink beam resources have been reserved, wherein the type of beam recovery is included as an indication in a same control resource set (CORESET) for each of a primary cell (PCell) recovery, a secondary cell (SCell) recovery, recovery of an uplink transmit beam associated with the PCell, and recovery of an uplink transmit beam associated with the SCell, and wherein the type of beam recovery is indicated by the same CORESET, the same downlink control information (DCI), and different additional bits to distinguish each of the PCell recovery, the SCell recovery, the recovery of the uplink transmit beam associated with the PCell, and the recovery of the uplink transmit beam associated with the SCell.

22. The apparatus of claim 21, wherein the type of beam recovery is indicated by an identification of the same CORESET scrambled with a different radio network temporary identifier (RNTI) for each of the PCell recovery, the SCell recovery, the recovery of the uplink transmit beam associated with the PCell, and the recovery of the uplink transmit beam associated with the SCell.

23. An apparatus for beam failure recovery in a wireless communications system, comprising:

one or more processors of a base station serving a user equipment (UE), the one or more processors, either alone or in combination, configured to:

receive, from the UE, a random access channel (RACH) request identifying one or more candidate downlink beams received at the UE from the base station; and send, to the UE, in response to reception of the RACH request, a response to the RACH request, the response identifying a second downlink beam from the one or more candidate downlink beams to replace the first downlink beam and indicating a type of beam recovery associated with the second downlink beam for which downlink beam resources have been reserved, wherein the type of beam recovery is included as an indication in a same control resource set (CORESET) for each of a primary cell (PCell) recovery, a secondary cell (SCell) recovery, recovery of an uplink transmit beam associated with the PCell, and recovery of an uplink transmit beam associated with the SCell, and wherein the type of beam recovery is indicated by the same CORESET, the same downlink control information (DCI), and different additional bits to distinguish each of the PCell recovery, the SCell recovery, the recovery of the uplink transmit beam associated with the PCell, and the recovery of the uplink transmit beam associated with the SCell.

* * * * *